(12) United States Patent
Sillard et al.

(10) Patent No.: US 8,983,260 B2
(45) Date of Patent: Mar. 17, 2015

(54) NON-ZERO DISPERSION SHIFTED OPTICAL FIBER HAVING A LARGE EFFECTIVE AREA

(75) Inventors: Pierre Sillard, Le Chesnay (FR); Denis Molin, Draveil (FR)

(73) Assignee: Draka Comteq, B.V., Amsterdam (NL)

( * ) Notice: Subject to any disclaimer, the term of this patent is extended or adjusted under 35 U.S.C. 154(b) by 963 days.

(21) Appl. No.: 13/017,089

(22) Filed: Jan. 31, 2011

(65) Prior Publication Data

US 2011/0188826 A1    Aug. 4, 2011

(30) Foreign Application Priority Data

Feb. 1, 2010 (FR) ...................... 10 50697

(51) Int. Cl.
*G02B 6/36* (2006.01)
*G02B 6/02* (2006.01)
*G02B 6/036* (2006.01)

(52) U.S. Cl.
CPC ........ *G02B 6/02019* (2013.01); *G02B 6/02271* (2013.01); *G02B 6/0228* (2013.01); *G02B 6/0365* (2013.01); *G02B 6/03683* (2013.01)
USPC .......................................... 385/127; 254/1.24

(58) Field of Classification Search
USPC ......................................................... 385/127
See application file for complete search history.

(56) References Cited

U.S. PATENT DOCUMENTS

| | | |
|---|---|---|
| 4,838,643 A | 6/1989 | Hodges et al. |
| 4,852,968 A | 8/1989 | Reed |
| 5,194,714 A | 3/1993 | Le Sergent |
| 5,522,007 A | 5/1996 | Drouart et al. |
| 5,574,816 A | 11/1996 | Yang et al. |

(Continued)

FOREIGN PATENT DOCUMENTS

| | | |
|---|---|---|
| EP | 0992817 A1 | 4/2000 |
| EP | 1477831 A1 | 11/2004 |

(Continued)

OTHER PUBLICATIONS

European Search Report in counterpart European Application No. 11152073.0 dated May 20, 2011, pp. 1-8.

(Continued)

*Primary Examiner* — Eric Wong
(74) *Attorney, Agent, or Firm* — Additon, Higgins & Pendleton, P.A.

(57) ABSTRACT

A non-zero dispersion shifted optical fiber (NZDSF) includes a central core, an inner cladding, and an outer cladding. The central core has an outer radius $r_1$ and a maximum refractive index difference $Dn_1$ with respect to the outer cladding. The inner cladding includes a first intermediate cladding and a buried trench. The first intermediate cladding has an outer radius $r_2$ and a refractive index difference $Dn_2$ with respect to the outer cladding. The buried trench has an outer radius $r_3$, a width $w_3$, and a negative refractive index difference $Dn_3$ with respect to the outer cladding. In some embodiments, the inner cladding includes a second intermediate cladding having an outer radius $r_4$ and a refractive index difference $Dn_4$ with respect to the outer cladding. For a radius of curvature of 30 millimeters at a wavelength of 1625 nanometers, the optical fiber typically exhibits bending losses of about 0.5 dB/100 turns or less. At a wavelength of 1550 nanometers, the optical fiber's effective area is typically about 95 $\mu m^2$ or greater.

27 Claims, 1 Drawing Sheet

(56) References Cited

U.S. PATENT DOCUMENTS

| | | |
|---|---|---|
| 5,717,805 A | 2/1998 | Stulpin |
| 5,761,362 A | 6/1998 | Yang et al. |
| 5,911,023 A | 6/1999 | Risch et al. |
| 5,982,968 A | 11/1999 | Stulpin |
| 6,035,087 A | 3/2000 | Bonicel et al. |
| 6,066,397 A | 5/2000 | Risch et al. |
| 6,085,009 A | 7/2000 | Risch et al. |
| 6,134,363 A | 10/2000 | Hinson et al. |
| 6,175,677 B1 | 1/2001 | Yang et al. |
| 6,181,857 B1 | 1/2001 | Emeterio et al. |
| 6,202,447 B1 | 3/2001 | Drouart et al. |
| 6,210,802 B1 | 4/2001 | Risch et al. |
| 6,215,931 B1 | 4/2001 | Risch et al. |
| 6,269,663 B1 | 8/2001 | Drouart et al. |
| 6,314,224 B1 | 11/2001 | Stevens et al. |
| 6,321,012 B1 | 11/2001 | Shen |
| 6,321,014 B1 | 11/2001 | Overton et al. |
| 6,334,016 B1 | 12/2001 | Greer, IV |
| 6,381,390 B1 | 4/2002 | Hutton et al. |
| 6,459,839 B1 | 10/2002 | Sauvageon et al. |
| 6,493,491 B1 | 12/2002 | Shen et al. |
| 6,603,908 B2 | 8/2003 | Dallas et al. |
| 6,618,538 B2 | 9/2003 | Nechitailo et al. |
| 6,658,184 B2 | 12/2003 | Bourget et al. |
| 6,749,446 B2 | 6/2004 | Nechitailo |
| 6,904,218 B2 | 6/2005 | Sun et al. |
| 6,912,347 B2 | 6/2005 | Rossi et al. |
| 6,922,515 B2 | 7/2005 | Nechitailo et al. |
| 6,941,049 B2 | 9/2005 | Risch et al. |
| 7,045,010 B2 | 5/2006 | Sturman, Jr. |
| 7,162,128 B2 | 1/2007 | Lovie et al. |
| 7,164,835 B2 | 1/2007 | Matsuo et al. |
| 7,272,286 B2 | 9/2007 | Provost et al. |
| 7,322,122 B2 | 1/2008 | Overton et al. |
| 7,346,244 B2 | 3/2008 | Gowan et al. |
| 7,356,234 B2 | 4/2008 | de Montmorillon et al. |
| 7,483,613 B2 | 1/2009 | Bigot-Astruc et al. |
| 7,515,795 B2 | 4/2009 | Overton et al. |
| 7,526,177 B2 | 4/2009 | Matthijsse et al. |
| 7,555,186 B2 | 6/2009 | Flammer et al. |
| 7,555,187 B2 | 6/2009 | Bickham et al. |
| 7,567,739 B2 | 7/2009 | Overton et al. |
| 7,570,852 B2 | 8/2009 | Nothofer et al. |
| 7,574,095 B2 | 8/2009 | Lock et al. |
| 7,587,111 B2 | 9/2009 | de Montmorillon et al. |
| 7,599,589 B2 | 10/2009 | Overton et al. |
| 7,603,015 B2 | 10/2009 | Bickham et al. |
| 7,623,747 B2 | 11/2009 | de Montmorillon et al. |
| 7,639,915 B2 | 12/2009 | Parris et al. |
| 7,646,952 B2 | 1/2010 | Parris |
| 7,646,954 B2 | 1/2010 | Tatat |
| 7,665,902 B2 | 2/2010 | Griffioen et al. |
| 7,702,204 B2 | 4/2010 | Gonnet et al. |
| 7,724,998 B2 | 5/2010 | Parris et al. |
| 7,817,891 B2 | 10/2010 | Lavenne et al. |
| 8,041,172 B2 | 10/2011 | Sillard et al. |
| 8,073,301 B2 | 12/2011 | Gibson et al. |
| 8,145,027 B2 * | 3/2012 | Overton et al. ............... 385/128 |
| 2005/0244120 A1 | 11/2005 | Mishra |
| 2007/0003198 A1 | 1/2007 | Gibson et al. |
| 2008/0292262 A1 | 11/2008 | Overton et al. |
| 2009/0041415 A1 | 2/2009 | Tanobe et al. |
| 2009/0175583 A1 | 7/2009 | Overton |
| 2009/0214167 A1 | 8/2009 | Lookadoo et al. |
| 2009/0232463 A1 | 9/2009 | Gibson et al. |
| 2009/0252469 A1 | 10/2009 | Sillard et al. |
| 2009/0279833 A1 | 11/2009 | Overton et al. |
| 2009/0279835 A1 | 11/2009 | de Montmorillon et al. |
| 2009/0279836 A1 | 11/2009 | de Montmorillon et al. |
| 2009/0290841 A1 * | 11/2009 | Borel et al. ............... 385/127 |
| 2009/0297107 A1 | 12/2009 | Tatat |
| 2010/0021170 A1 | 1/2010 | Lumineau et al. |
| 2010/0028020 A1 | 2/2010 | Gholami et al. |
| 2010/0067855 A1 | 3/2010 | Barker |
| 2010/0067857 A1 | 3/2010 | Lovie et al. |
| 2010/0092135 A1 | 4/2010 | Barker et al. |
| 2010/0092138 A1 | 4/2010 | Overton |
| 2010/0092139 A1 | 4/2010 | Overton |
| 2010/0092140 A1 | 4/2010 | Overton |
| 2010/0118388 A1 | 5/2010 | Pastouret et al. |
| 2010/0119202 A1 | 5/2010 | Overton |
| 2010/0135623 A1 | 6/2010 | Overton |
| 2010/0135624 A1 | 6/2010 | Overton et al. |
| 2010/0135625 A1 | 6/2010 | Overton |
| 2010/0135627 A1 | 6/2010 | Pastouret et al. |
| 2010/0142033 A1 | 6/2010 | Regnier et al. |
| 2010/0142969 A1 | 6/2010 | Gholami et al. |
| 2010/0150505 A1 | 6/2010 | Testu et al. |
| 2010/0154479 A1 | 6/2010 | Milicevic et al. |
| 2010/0166375 A1 | 7/2010 | Parris |
| 2010/0171945 A1 | 7/2010 | Gholami et al. |
| 2010/0183821 A1 | 7/2010 | Hartsuiker et al. |
| 2010/0189397 A1 | 7/2010 | Richard et al. |
| 2010/0189399 A1 | 7/2010 | Sillard et al. |
| 2010/0189400 A1 | 7/2010 | Sillard et al. |
| 2010/0202741 A1 | 8/2010 | Ryan et al. |
| 2010/0214649 A1 | 8/2010 | Burov et al. |
| 2010/0215328 A1 | 8/2010 | Tatat et al. |
| 2010/0254653 A1 | 10/2010 | Molin et al. |
| 2010/0310218 A1 | 12/2010 | Molin et al. |
| 2011/0026889 A1 | 2/2011 | Risch et al. |
| 2011/0044595 A1 | 2/2011 | Sillard et al. |
| 2011/0058781 A1 | 3/2011 | Molin et al. |
| 2011/0064367 A1 | 3/2011 | Molin et al. |
| 2011/0064371 A1 | 3/2011 | Leatherman et al. |
| 2011/0069724 A1 | 3/2011 | Richard et al. |
| 2011/0069932 A1 | 3/2011 | Overton et al. |
| 2011/0091171 A1 | 4/2011 | Tatat et al. |
| 2011/0123161 A1 | 5/2011 | Molin et al. |
| 2011/0123162 A1 | 5/2011 | Molin et al. |
| 2011/0135262 A1 | 6/2011 | Molin et al. |
| 2011/0135263 A1 | 6/2011 | Molin et al. |
| 2011/0176782 A1 | 7/2011 | Parris |
| 2011/0188823 A1 | 8/2011 | Sillard et al. |
| 2011/0188826 A1 | 8/2011 | Sillard et al. |
| 2012/0033924 A1 | 2/2012 | Gibson et al. |
| 2012/0093471 A1 | 4/2012 | Gibson et al. |

FOREIGN PATENT DOCUMENTS

| | | |
|---|---|---|
| EP | 1739063 A2 | 1/2007 |
| EP | 1921478 A1 | 5/2008 |
| EP | 1978383 A1 | 10/2008 |
| EP | 2211212 A1 | 7/2010 |
| EP | 2352047 A1 | 8/2011 |
| FR | 2864254 A1 | 6/2005 |
| JP | 2002-526806 A | 8/2002 |
| WO | 2004/092794 A | 10/2004 |
| WO | 2008/106033 A2 | 9/2008 |
| WO | 2008/137150 A1 | 11/2008 |
| WO | 2009/062131 A1 | 5/2009 |

OTHER PUBLICATIONS

French Search Report in counterpart French Application No. 1050697 dated Sep. 23, 2010, pp. 1-8.

Matsuo et al., "New Medium-Dispersion Fiber with Large Effective Area and Low Dispersion Slope", Optical Fiber Communication Conference and Exhibit, Mar. 17, 2002, pp. 329-330.

Notification of Reason(s) for Refusal in counterpart Japanese Application No. 2011-014784 dated Apr. 22, 2014, pp. 1-5.

English-translation of Notification of Reason(s) for Refusal in counterpart Japanese Application No. 2011-014784 dated Apr. 22, 2014, pp. 1-6.

* cited by examiner

NON-ZERO DISPERSION SHIFTED OPTICAL FIBER HAVING A LARGE EFFECTIVE AREA

CROSS-REFERENCE TO PRIORITY APPLICATION

This application hereby claims the benefit of pending French application Ser. No. 10/50697 for a "Fibre Optique a Dispersion Decalee Non Nulle" (filed Feb. 1, 2010 at the National Institute of Industrial Property (France)), which is hereby incorporated by reference in its entirety.

FIELD OF THE INVENTION

The present invention relates to the field of optical-fiber transmissions and, more specifically, to a non-zero dispersion shifted fiber exhibiting low bending losses and a large effective area.

BACKGROUND

An optical fiber (i.e., a glass fiber typically surrounded by one or more coating layers) conventionally includes an optical fiber core, which transmits and/or amplifies an optical signal, and an optical cladding, which confines the optical signal within the core. Accordingly, the refractive index of the core $n_c$ is typically greater than the refractive index of the optical cladding $n_g$ (i.e., $n_c > n_g$).

For optical fibers, the refractive index profile is generally classified according to the graphical appearance of the function that associates the refractive index with the radius of the optical fiber. Conventionally, the distance r to the center of the optical fiber is shown on the x-axis, and the difference between the refractive index (at radius r) and the refractive index of the optical fiber's outer cladding (e.g., an outer optical cladding) is shown on the y-axis. The refractive index profile is referred to as a "step" profile, "trapezoidal" profile, "alpha" profile, or "triangular" profile for graphs having the respective shapes of a step, a trapezoid, an alpha, or a triangle. These curves are generally representative of the optical fiber's theoretical or set profile. Constraints in the manufacture of the optical fiber, however, may result in a slightly different actual profile.

Generally speaking, two main categories of optical fibers exist: multimode fibers and single-mode fibers. In a multimode optical fiber, for a given wavelength, several optical modes are propagated simultaneously along the optical fiber. In a single-mode optical fiber, the signal propagates in a fundamental LP01 mode that is guided in the fiber core, while the higher order modes (e.g., the LP11 mode) are strongly attenuated.

Conventionally, so-called "standard" single mode fibers (SSMFs) are used for land-based transmission systems. To facilitate compatibility between optical systems from different manufacturers, the International Telecommunication Union (ITU) defined a standard reference ITU-T G.652 with which a standard optical transmission fiber (i.e., a standard single-mode fiber or SSMF) should comply. The ITU-T G.652 recommendations and each of its attributes (i.e., A, B, C, and D) are hereby incorporated by reference.

Typically, an SSMF complies with specific telecommunications standards, such as the ITU-T G.652 recommendations. Conventionally, an SSMF exhibits the following properties: (i) at a wavelength of 1550 nanometers (nm), attenuation of about 0.190 decibels per kilometer (dB/km); (ii) at a wavelength of 1550 nanometers, an effective area of about 80 square microns ($\mu m^2$); (iii) a 22-meter cable cutoff wavelength (22 m-$\lambda_{cc}$) of less than 1260 nanometers; (iv) a positive chromatic dispersion of about 17 picoseconds per nanometer kilometer (ps/(nm·km)); and (v) at a wavelength of 1550 nanometers, a positive dispersion slope of 0.058 picoseconds per nanometer square kilometer (ps/(nm²·km)).

For wavelength division multiplexing (WDM) applications, single-mode non-zero dispersion shifted fibers (NZDSFs) are also used. An NZDSF exhibits a chromatic dispersion at a wavelength of 1550 nanometers that is less than the chromatic dispersion of an SSMF. A dispersion shifted fiber presenting non-zero chromatic dispersion that is positive for the wavelength at which it is used (e.g., about 1550 nanometers) is commonly referred to as an NZDSF+. At a wavelength of 1550 nanometers, an NZDSF+ typically presents a chromatic dispersion of between about 3 ps/(nm·km) and 14 ps/(nm·km), and a chromatic dispersion slope of less than 0.1 ps/(nm²·km). An NZDSF+ typically complies with specific telecommunications standards, such as the ITU-T G.655 and ITU-T G.656 recommendations. The ITU-T G.655 and ITU-T G.656 recommendations are hereby incorporated by reference.

Conventionally, an NZDSF has a triple-clad structure (i.e., a triple-clad NZDSF). An exemplary NZDSF includes: (i) a central core having a refractive index difference with respect to an outer cladding (e.g., and outer optical cladding); (ii) a first inner cladding (e.g., an intermediate cladding) having a refractive index difference with respect to the outer cladding; and (iii) a second inner cladding (e.g., a ring) having a positive refractive index difference with respect to the outer cladding. The refractive indices in the central core, the intermediate cladding, and the ring are substantially constant over their entire widths. Conventional NZDSFs are commercially available, such as eLEAF® fiber, TrueWaveRS® fiber, or Draka Communications' TeraLight® fiber.

An NZDSF may have a coaxial refractive index profile (i.e., a coaxial NZDSF). The central core of an NZDSF having a coaxial refractive index profile includes two zones. The first zone is located in the center of the central core and has a refractive index difference with respect to the outer cladding that is less than that of the second zone. The second zone has a positive refractive index difference with respect to the outer cladding. The first zone's refractive index difference with respect to the outer cladding may be positive, negative or even zero.

An NZDSF may also include: a central core; an inner cladding; and a buried trench (i.e., a cladding layer having a negative refractive index difference with respect to the outer cladding). Typically, this kind of profile is simpler to fabricate. Additionally, for approximately identical optical characteristics, this kind of NZDSF's central core has a refractive index difference that is less than a triple-clad NZDSF's central-core refractive index difference. Consequently, less central core doping is required to achieve this kind of NZDSF, which in turn reduces signal attenuation, particularly attenuation losses caused by Rayleigh diffusion.

In use, optical fibers may be subjected to bends that attenuate the signals conveyed by the optical fiber. Minimizing an optical fiber's bend loss typically improves the quality of the signal conveyed.

Increasing the effective area of an optical fiber allows signals to be transmitted through the optical fiber at higher powers without increasing the non-linear effects in the optical fiber. A transmission optical fiber having an enlarged effective area allows transmission over longer distances and/or increases the operating margins of the transmission system.

Generally speaking, improving certain optical characteristics can have a detrimental effect on other optical characteristics, which can reduce an optical fiber's compatibility with other optical fibers. Thus, it is generally desirable to improve certain optical characteristics while maintaining suitable compatibility between optical fibers.

The article *"New Medium-Dispersion Fiber with Large Effective Area and Low Dispersion Slope"* by S. Matsuo, et al., published in Optical Fiber Communication Conference and Exhibit 2002, OFC 2002, Vol., Issue, Mar. 17-22, 2002, pp. 329-330, which is hereby incorporated by reference in its entirety, describes a coaxial NZDSF having an effective area of about 100 $\mu m^2$. Nevertheless, the optical fiber's central core includes a zone having a refractive index difference greater than $13 \times 10^{-3}$. Such a high refractive index difference can give rise to strong attenuation at a wavelength of 1550 nanometers, such as attenuation greater than 0.21 dB/km (e.g., 0.22 dB/km or more).

European Patent No. 0,992,817 and its counterpart U.S. Pat. No. 6,459,839, each of which is hereby incorporated by reference in its entirety, describe a triple-clad NZDSF that possesses low bending loss and a large effective area. Nevertheless, for comparable optical characteristics, the optical fiber's central core has a refractive index difference of about $13.7 \times 10^{-3}$, which is greater than in an optical fiber that includes a buried trench. At a wavelength of 1550 nanometers, the disclosed optical fiber, therefore, exhibits attenuation that is greater than 0.20 dB/km, or even greater than 0.21 dB/km. These attenuation values are greater than in an optical fiber that includes a buried trench. Additionally, the disclosed triple-clad NZDSF is more difficult to manufacture than an optical fiber that includes a buried trench, because the parameters of the triple-clad NZDSF's ring are more sensitive and require fabrication tolerances that are smaller than those for an effective buried trench.

European Patent No. 1,477,831 and its counterpart U.S. Pat. No. 6,904,218, each of which is hereby incorporated by reference in its entirety, describe the use of a buried trench to improve the optical characteristics of an SSMF. Similarly, European Patent No. 1,978,383 and U.S. Patent Publication No. 2005/0244120, each of which is hereby incorporated by reference in its entirety, describe the use of a buried trench to improve the optical characteristics of an SSMF. Nevertheless, these documents fail to disclose an NZDSF with improved bending losses and an enlarged effective area.

U.S. Pat. No. 4,852,968, which is hereby incorporated by reference in its entirety, describes the use of a buried trench placed close to the central core to decrease the values of chromatic dispersion and chromatic dispersion slope. Nevertheless, the disclosed optical fiber has a ratio of inside trench radius to central core radius that is between about 1.5 and 3.5, which can give rise to (i) large bending loss values for radii of 30 millimeters (mm), and (ii) at a wavelength of 1550 nm, an effective area of less than 55 $\mu m^2$.

International Patent Application Publication No. WO2008/106033 and its counterpart U.S. Pat. No. 7,603,015, each of which is hereby incorporated by reference in its entirety, present NZDSFs that include a buried trench. One of the exemplary NZDSFs has an effective area that is greater than 100 $\mu m^2$. Nevertheless, the central core has a refractive index difference that is too small and a radius that is too great. Furthermore, the inner cladding has a refractive index difference of zero with respect to the optical cladding. The characteristics of the central core and inner cladding give rise to excessive bending losses at large radii of curvature (e.g., greater than 25 millimeters). For example, the present inventors have calculated that, at the wavelength of 1625 nanometers and a radius of curvature of 30 millimeters, the exemplary NZDSF exhibits bending losses of greater than 10 decibels per 100 turns (dB/100 turns).

Therefore, a need exists for an NZDSF that permits higher transmission powers without increasing the non-linear effects, while maintaining suitable compatibility with other optical fibers and exhibiting low bending losses for large radii of curvature.

SUMMARY

Accordingly, in one aspect, the invention embraces a non-zero dispersion shifted optical fiber (NZDSF) that includes a central core, an inner cladding, and an outer cladding (e.g., an outer optical cladding). The central core has an outer radius $r_1$ and a maximum refractive index difference $Dn_1$ with respect to the outer cladding.

In an exemplary embodiment, the optical fiber's inner cladding includes an intermediate cladding and a buried trench. Typically, the intermediate cladding is positioned between the central core and the buried trench (e.g., immediately surrounding the central core). In some embodiments, the buried trench immediately surrounds the intermediate cladding. The intermediate cladding has an outer radius $r_2$ and a refractive index difference $Dn_2$ with respect to the outer cladding. The buried trench has an outer radius $r_3$, a width $w_3$, and a negative refractive index difference $Dn_3$ with respect to the outer cladding.

In another exemplary embodiment, at a wavelength of 1550 nanometers, the optical fiber's effective area is at least about 95 $\mu m^2$.

In yet another exemplary embodiment, for a radius of curvature of 30 millimeters at a wavelength of 1625 nanometers, the optical fiber exhibits bending losses of less than about 0.5 dB/100 turns.

In yet another exemplary embodiment, for a radius of curvature of 30 millimeters at a wavelength of 1625 nanometers, the optical fiber exhibits bending losses of less than about 0.01 dB/100 turns (e.g., less than 0.05 dB/100 turns).

In yet another exemplary embodiment, for a radius of curvature of 30 millimeters at a wavelength of 1550 nanometers, the optical fiber exhibits bending losses of less than about 0.1 dB/100 turns (e.g., less than 0.005 dB/100 turns).

In yet another exemplary embodiment, the optical fiber possesses a 22-meter cable cutoff wavelength (22 m-$\lambda_{cc}$) of less than about 1650 nanometers.

In yet another exemplary embodiment, the optical fiber possesses a 22-meter cable cutoff wavelength (22 m-$\lambda_{cc}$) of less than about 1530 nanometers (e.g., less than 1450 nanometers).

In yet another exemplary embodiment, at a wavelength of 1550 nanometers, the optical fiber possesses a chromatic dispersion slope of about 0.110 ps/(nm$^2$·km) or less.

In yet another exemplary embodiment, at a wavelength of 1550 nanometers, the optical fiber exhibits chromatic dispersion of between about 3 ps/(nm·km) and 14 ps/(nm·km) (e.g., between about 4 ps/(nm·km) and 12 ps/(nm·km)).

In yet another exemplary embodiment, the central core's outer radius $r_1$ is between about 1.0 micron and 2.5 microns.

In yet another exemplary embodiment, the optical fiber's inner cladding includes an intermediate cladding having an outer radius $r_2$, and the ratio of the intermediate cladding's outer radius $r_2$ to the central core's outer radius $r_1$ (i.e., the ratio $r_2$:$r_1$) is between about 5 and 9.

In yet another exemplary embodiment, the optical fiber's inner cladding includes a buried trench having a width $w_3$ of between about 3 microns and 6 microns.

In yet another exemplary embodiment, the optical fiber's inner cladding includes a buried trench having an outer radius $r_3$ of about 19 microns or less.

In yet another exemplary embodiment, the central core's maximum refractive index difference $Dn_1$ is between about $6.5 \times 10^{-3}$ and $10.5 \times 10^{-3}$.

In yet another exemplary embodiment, the optical fiber's inner cladding includes an intermediate cladding having a refractive index difference $Dn_2$ with respect to the outer cladding of between about $1 \times 10^{-3}$ and $2.5 \times 10^{-3}$.

In yet another exemplary embodiment, the optical fiber's inner cladding includes a buried trench having a refractive index difference $Dn_3$ with respect to the outer cladding of between about $-15 \times 10^{-3}$ and $-4 \times 10^{-3}$.

In yet another exemplary embodiment, the optical fiber's inner cladding includes a first intermediate cladding, a buried trench, and a second intermediate cladding. Typically, the first intermediate cladding is positioned between the central core and the buried trench (e.g., immediately surrounding the central core). The buried trench is typically positioned between the first intermediate cladding and the second intermediate cladding (e.g., immediately surrounding the first intermediate cladding). In some embodiments, the second intermediate cladding immediately surrounds the buried trench. The first intermediate cladding has an outer radius $r_2$ and a refractive index difference $Dn_2$ with respect to the outer cladding. The buried trench has an outer radius $r_3$, a width $w_3$, and a negative refractive index difference $Dn_3$ with respect to the outer cladding. The second intermediate cladding has an outer radius $r_4$ and a refractive index difference $Dn_4$ with respect to the outer cladding.

In yet another exemplary embodiment, the optical fiber's inner cladding includes a second intermediate cladding having a refractive index difference $Dn_4$ with respect to the outer cladding of between about $-10.5 \times 10^{-3}$ and $-6.5 \times 10^{-3}$.

In yet another exemplary embodiment, the optical fiber's inner cladding includes a second intermediate cladding having an outer radius $r_4$ of about 41 microns or less.

In yet another exemplary embodiment, the optical fiber's inner cladding includes a second intermediate cladding having a refractive index difference $Dn_4$ with respect to the outer cladding, and the difference between the central core's maximum refractive index difference $Dn_1$ and the second intermediate cladding's refractive index difference $Dn_4$ (i.e., $Dn_1 - Dn_4$) is between about $6.5 \times 10^{-3}$ and $10.5 \times 10^{-3}$.

In yet another exemplary embodiment, the optical fiber's inner cladding includes a first intermediate cladding having a refractive index difference $Dn_2$ with respect to the outer cladding of between about $1 \times 10^{-3}$ and $2.5 \times 10^{-3}$.

In yet another exemplary embodiment, the optical fiber's inner cladding includes a buried trench having a refractive index difference $Dn_3$ with respect to the outer cladding and a second intermediate cladding having a refractive index difference $Dn_4$ with respect to the outer cladding, and the difference between the buried trench's refractive index difference $Dn_3$ and the second intermediate cladding's refractive index difference $Dn_4$ (i.e., $Dn_3 - Dn_4$) is between about $-15 \times 10^{-3}$ and $-4 \times 10^{-3}$.

In yet another exemplary embodiment, at a wavelength of 1550 nanometers, the optical fiber exhibits attenuation of less than about 0.190 dB/km (e.g., 0.180 dB/km or less).

The foregoing illustrative summary, as well as other exemplary objectives and/or advantages of the invention, and the manner in which the same are accomplished, are further explained within the following detailed description and its accompanying drawings.

DETAILED DESCRIPTION

In one aspect, the invention embraces a non-zero dispersion shifted fiber (NZDSF) that permits higher single-mode transmission powers without increasing non-linear effects, while maintaining suitable compatibility with other optical fibers and exhibiting low bending losses for large radii of curvature. To this end, NZDSFs according to the present invention typically possess large effective areas while preserving other optical characteristics (e.g., dispersion values, cutoff wavelengths, and attenuation). Those of ordinary skill in the art will recognize that single-mode transmission typically refers to transmission of the fundamental propagation mode LP01.

Exemplary optical fibers according to the present invention are NZDSFs that possess a chromatic dispersion that is less than the chromatic dispersion of a step-index standard single-mode fiber (SSMF). At a wavelength of 1550 nanometers, exemplary optical fibers may possess a chromatic dispersion of less than about 14 ps/(nm·km) (e.g., between about 3 ps/(nm·km) and 14 ps/(nm·km)). Typically, exemplary optical fibers possess a positive chromatic dispersion.

The optical fiber includes a central core, an inner cladding, and an outer cladding (e.g., an outer optical cladding). The inner cladding is typically position between the central core and the outer cladding.

At a wavelength of 1550 nanometers, the optical fiber's effective area is typically at least about 95 μm².

For a radius of curvature of 30 millimeters at a wavelength of 1625 nanometers, exemplary optical fibers exhibit bending losses of less than about 0.5 dB/100 turns. More typically, for a radius of curvature of 30 millimeters at a wavelength of 1625 nanometers, exemplary optical fibers exhibit bending losses of about 0.1 dB/100 turns or less (e.g., about 0.05 dB/100 turns or less).

Figure 1:
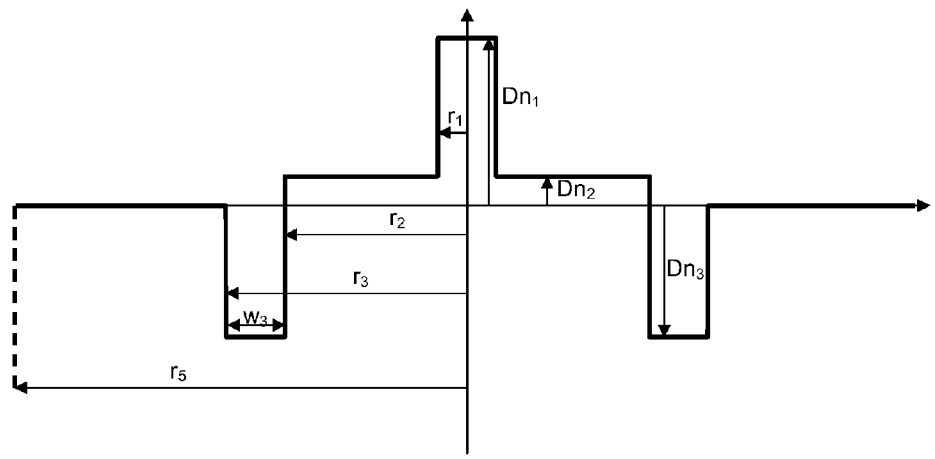
FIG. 1 schematically depicts the set profile of an exemplary optical fiber according to the present invention.
Figure 2:
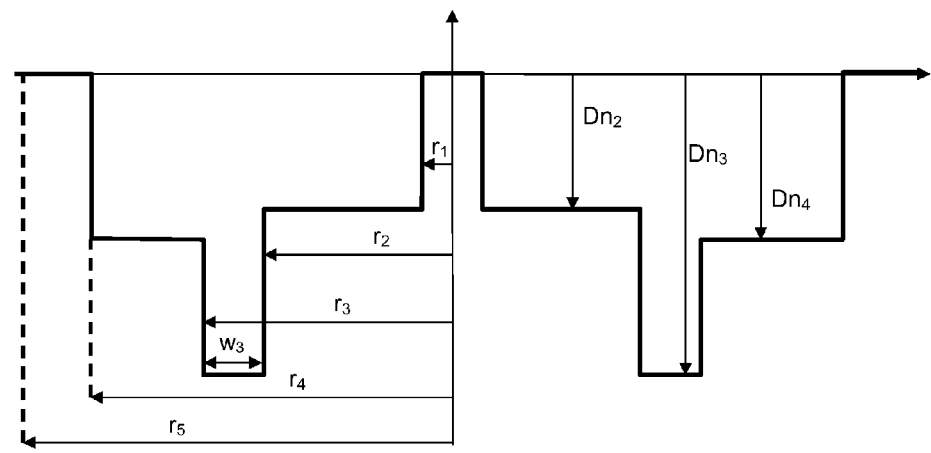
FIG. 2 schematically depicts the set profile of another exemplary optical fiber according to the present invention.

FIGS. 1 and 2 schematically depict the set profiles of two exemplary embodiments of an optical fiber according to the present invention. As previously discussed, manufactured optical fibers typically possess refractive index profiles that deviate slightly from their set profiles (i.e., the theoretical refractive-index profiles).

Both FIG. 1 and FIG. 2 depict a central core having a step refractive-index profile. Thus, the central core's refractive index difference is constant and equal to the central core's maximum refractive index difference $Dn_1$. That said, the central core may also have a trapezoidal, triangular, or alpha profile (i.e., a refractive index profile that varies as a function of radial position).

Furthermore, both FIG. 1 and FIG. 2 depict inner cladding layers, each having a constant refractive index difference with respect to the outer cladding. Exemplary optical fibers according to the invention, however, may have one or more refractive index differences that vary as a function of radial position (e.g., a trapezoidal, triangular, or alpha profile). For inner cladding layers having non-constant refractive indices, the respective refractive index differences (e.g., the buried trench's refractive index difference $Dn_3$) refer to the largest refractive index difference between an inner cladding layer and the outer cladding layer in terms of absolute value.

Those of ordinary skill in the art will recognize that the outer cladding typically has a constant refractive index. That said, if the outer cladding has a non-constant refractive index, refractive index differences are typically measured with respect to the innermost portion of the outer cladding (i.e., that portion of the outer cladding that is closest to the central core and that may affect the propagation of optical signals within the optical fiber).

As depicted in FIG. 1, an exemplary optical fiber includes a central core having an outer radius $r_1$ and a maximum refractive index difference $Dn_1$ with respect to the outer cladding. The optical fiber's inner cladding includes an intermediate cladding having an outer radius $r_2$ and a refractive index difference $Dn_2$ with respect to the outer cladding. As shown, the intermediate cladding immediately surrounds the central core. The optical fiber's inner cladding also includes a buried trench having an outer radius $r_3$, a width $w_3$, and a negative refractive index difference $Dn_3$ with respect to the outer cladding.

The central core's outer radius $r_1$ is typically between about 1 micron and 2.5 microns. The central core's profile facilitates reduced chromatic dispersion. The limited quantity of dopant in the central core also facilitates control over attenuation losses from Rayleigh diffusion.

In some exemplary embodiments, the ratio of the intermediate cladding's outer radius $r_2$ to the central core's outer radius $r_1$ (i.e., the ratio $r_2:r_1$) is between about 5 and 9. Without being bound to any particular theory, the present inventors have found that increasing the ratio $r_2:r_1$ moves the buried trench farther away from the central core, thereby preventing the buried trench from disturbing the propagation of the fundamental mode. Adjusting the ratio $r_2:r_1$ also facilitates control over the optical fiber's effective area and chromatic dispersion.

The buried trench may be directly adjacent to the intermediate cladding (i.e., the buried trench may immediately surround the intermediate cladding). Typically, the buried trench's width $w_3$ is between about 3 microns and 6 microns. The buried trench's outer radius $r_3$ is typically less than about 19 microns. The characteristics of the buried trench can facilitate the achievement of reduced bending losses. The characteristics of the buried trench also facilitate control over the optical fiber's cutoff wavelength by controlling the losses of modes having an order directly greater than the fundamental mode (e.g., the LP11 and LP02 modes).

The outer cladding is typically an optical cladding. The outer cladding has an outer radius $r_5$. Exemplary optical fibers include an outer cladding with an outer radius $r_5$ of about 50 microns, and the glass fiber itself has an outer diameter of 100 microns. In other exemplary embodiments, the outer cladding has an outer radius $r_5$ of 62.5 microns, and the glass fiber itself has an outer diameter of 125 microns.

The central core and the inner cladding (e.g., the intermediate cladding and the buried trench) may be manufactured using a chemical vapor deposition (CVD) method performed on the interior surface of a silica tube. In this regard, the outer cladding may be constituted by the silica tube and glass buildup on the silica tube (e.g., via an overcladding or sleeving method). The silica tube and any buildup is typically natural or doped silica. The outer cladding may also be obtained by any other deposition techniques, such as vapor axial deposition (VAD) or outside vapor deposition (OVD).

In accordance with FIG. 1, one exemplary optical fiber includes a central core having a maximum refractive index difference $Dn_1$ with respect to the outer cladding of between about $6.5 \times 10^{-3}$ and $10.5 \times 10^{-3}$. The intermediate cladding has a refractive index difference $Dn_2$ with respect to the outer cladding of between about $1 \times 10^{-3}$ and $2.5 \times 10^{-3}$. The buried trench has a refractive index difference $Dn_3$ with respect to the outer cladding of between about $-15 \times 10^{-3}$ and $-4 \times 10^{-3}$. The central core may be doped to raise its refractive index above the refractive index of the outer cladding. For example, the central core may be doped with germanium and/or any other suitable dopant(s). In some embodiments, the outer cladding may be doped with fluorine and/or any other suitable dopant(s). Similarly, the intermediate cladding's refractive index difference $Dn_2$ and the buried trench's refractive index difference $Dn_3$ may be obtained using suitable dopant(s).

In accordance with FIG. 1, another exemplary optical fiber includes a central core, an inner cladding, and an outer cladding serving as an optical cladding. The central core has an outer radius $r_1$ and a positive maximum refractive index difference $Dn_1$ with respect to the outer cladding. The inner cladding includes an intermediate cladding and a buried trench. The intermediate cladding has an outer radius $r_2$ and a refractive index difference $Dn_2$ with respect to the outer cladding of between about $1 \times 10^{-3}$ and $2.5 \times 10^{-3}$. The buried trench has an outer radius $r_3$, a width $w_3$, and a negative refractive index difference $Dn_3$ with respect to the outer cladding.

As noted and in accordance with FIG. 1, for a radius of curvature of 30 millimeters at a wavelength of 1625 nanometers, the exemplary optical fiber exhibits bending losses of less than about 0.5 dB/100 turns. More typically, for a radius of curvature of 30 millimeters at a wavelength of 1625 nanometers, the exemplary optical fiber exhibits bending losses of about 0.1 dB/100 turns or less (e.g., about 0.05 dB/100 turns or less). At a wavelength of 1550 nanometers, the exemplary optical fiber's effective area is typically at least about 95 µm².

In exemplary embodiments, the optical fiber's inner cladding may include only an intermediate cladding and a buried trench. In this regard, the intermediate cladding immediately surrounds the central core, the buried trench immediately surrounds the intermediate cladding, and the optical cladding immediately surrounds the buried trench.

As depicted in FIG. 2, the optical fiber's inner cladding includes a first intermediate cladding, a buried trench, and a second intermediate cladding. The second intermediate cladding has an outer radius $r_4$ and a refractive index difference $Dn_4$ with respect to the outer cladding.

In accordance with FIG. 2, an exemplary optical fiber's central core has a maximum refractive index difference $Dn_1$ with respect to the outer cladding that is substantially equal to zero (i.e., the central core's refractive index is approximately equal to the outer cladding's refractive index). In this regard, the central core may be doped with fluorine, germanium, and/or any other suitable dopant(s) to obtain a refractive index difference that is substantially equal to zero. For example, the central core and the outer cladding may be made of pure silica. An optical fiber with a central core made of pure silica is commonly referred to as a pure silica core fiber (PSCF). Low core-doping and pure silica cores can facilitate the achievement of optical-fiber attenuation values of less than 0.190 dB/km (e.g., less than 0.180 dB/km) at a wavelength of 1550 nanometers. Low attenuation is particularly advantageous in long distance transmission applications.

In some exemplary embodiments, the difference between the central core's maximum refractive index difference $Dn_1$ and the second intermediate cladding's refractive index difference $Dn_4$ (i.e., $Dn_1-Dn_4$) is between about $6.5 \times 10^{-3}$ and $10.5 \times 10^{-3}$. The difference $Dn_1-Dn_4$ may be achieved by reducing the refractive index of the second intermediate cladding using a suitable dopant.

As depicted in FIG. 2, the inner cladding is buried, i.e., the inner cladding's refractive index is less than the outer cladding's refractive index. In this regard, the first intermediate cladding, the buried trench, and the second intermediate cladding each have a refractive index that is less than the outer cladding's refractive index. The inner cladding's refractive index may be decreased to less than the outer cladding's refractive index by doping with fluorine, germanium, and/or any other suitable dopant.

In some exemplary embodiments, the difference between the first intermediate cladding's refractive index $Dn_2$ and the second intermediate cladding's refractive index $Dn_4$ (i.e., $Dn_2-Dn_4$) is between about $1\times10^{-3}$ and $2.5\times10^{-3}$. The difference between the buried trench's refractive index difference $Dn_3$ and the second intermediate cladding's refractive index difference $Dn_4$ (i.e., $Dn_3-Dn_4$) is between about $-15\times10^{-3}$ and $-4\times10^{-3}$. The differences $Dn_2-Dn_4$ and $Dn_3-Dn_4$ may be achieved by reducing the refractive indices respectively of the first intermediate cladding and of the buried trench by suitable doping. Additionally, the differences $Dn_2-Dn_4$ and $Dn_3-Dn_4$ may be achieved by reducing or increasing the refractive index of the second intermediate cladding by suitable doping.

The second intermediate cladding typically has a refractive index difference $Dn_4$ with respect to the outer cladding of between about $-10.5\times10^{-3}$ and $-6.5\times10^{-3}$. The second intermediate cladding may have an outer radius $r_4$ of less than about 41 microns. Reducing the second intermediate cladding's outer radius typically helps to reduce the manufacturing costs associated with doping the optical fiber's inner cladding.

Without being bound to any particular theory, the present inventors have found that, when the outer cladding's refractive index is approximately the same as the central core's refractive index, bringing the outer cladding closer to the central core (i.e., reducing the difference between the central core's outer radius $r_1$ and the outer cladding's inner radius) increases the leakage loss of the fundamental propagation mode LP01. Nevertheless, in some exemplary optical fibers, it is possible to bring the outer cladding closer to the central core and reduce the buried trench's outer radius $r_3$, while preserving fundamental mode leakage losses of less than about 0.020 dB/km (e.g., 0.010 dB/km or less) at a wavelength of 1550 nanometers.

In accordance with FIG. 2, another exemplary optical fiber includes a central core, an inner cladding, and an outer cladding that functions as an optical cladding. The inner cladding is typically positioned between the central core and the outer cladding. The central core has an outer radius $r_1$ and a maximum refractive index difference $Dn_1$ with respect to the outer cladding.

The inner cladding includes a first intermediate cladding, a buried trench, and a second intermediate cladding. Typically, the inner cladding's buried trench is positioned between the first intermediate cladding and the second intermediate cladding. The first intermediate cladding has an outer radius $r_2$ and a refractive index difference $Dn_2$ with respect to the outer cladding. The buried trench has an outer radius $r_3$, a width $w_3$, and a negative refractive index difference $Dn_3$ with respect to the outer cladding. The second intermediate cladding has an outer radius $r_4$ and a refractive index difference $Dn_4$ with respect to the outer cladding that is less than the central core's maximum refractive index difference $Dn_1$. The difference between the first intermediate cladding's refractive index $Dn_2$ and the second intermediate cladding's refractive index $Dn_4$ (i.e., $Dn_2-Dn_4$) is between about $1\times10^{-3}$ and $2.5\times10^{-3}$.

As noted and in accordance with FIG. 2, for a radius of curvature of 30 millimeters at a wavelength of 1625 nanometers, the exemplary optical fiber exhibits bending losses of less than about 0.5 dB/100 turns. More typically, for a radius of curvature of 30 millimeters at a wavelength of 1625 nanometers, the exemplary optical fiber exhibits bending losses of about 0.1 dB/100 turns or less (e.g., about 0.05 dB/100 turns or less). At a wavelength of 1550 nanometers, the exemplary optical fiber's effective area is typically at least about 95 $\mu m^2$.

In exemplary embodiments, the optical fiber's inner cladding may include only a first intermediate cladding, a buried trench, and a second intermediate cladding. In this regard, the first intermediate cladding immediately surrounds the central core, the buried trench immediately surrounds the first intermediate cladding, the second intermediate cladding immediately surrounds the buried trench, and the outer cladding immediately surrounds the second intermediate cladding.

Exemplary optical fibers of the present invention exhibit low bending losses and have a large effective area. In this regard, for a radius of curvature of 30 millimeters at a wavelength of 1625 nanometers, exemplary optical fibers exhibit bending losses of less than about 0.5 dB/100 turns. More typically, for a radius of curvature of 30 millimeters at a wavelength of 1625 nanometers, exemplary optical fibers exhibit bending losses of about 0.1 dB/100 turns or less (e.g., about 0.05 dB/100 turns or less). For a radius of curvature of 30 millimeters at a wavelength of 1550 nanometers, exemplary optical fibers exhibit bending losses of less than about 0.01 dB/100 turns (e.g., 0.005 dB/100 turns or less). At a wavelength of 1550 nanometers, exemplary optical fibers may have an effective area of about 95 $\mu m^2$ or more (e.g., 98 $\mu m^2$ or more). Typically, the optical fiber's effective area is less than 130 $\mu m^2$ at a wavelength of 1550 nanometers. Thus, exemplary NZDSFs according to the invention accommodate large radii of curvature and permit higher transmission powers without increasing non-linear effects.

Additionally, the optical fibers of the present invention typically possess acceptable values for all of the optical parameters that enable good compatibility with other optical fibers. In particular, at a wavelength of 1550 nanometers, the optical fibers may present a chromatic dispersion of between about 3 ps/(nm·km) and 14 ps/(nm·km) (e.g., between 4 ps/(nm·km) and 12 ps/(nm·km)) and a chromatic dispersion slope of about 0.110 ps/(nm²·km) or less.

The 22-meter cable cutoff wavelength (22 m-$\lambda_{cc}$) is conventionally measured as the wavelength at which the optical signal is single mode after propagating along 22 meters of fiber, as defined by subcommittee 86A of the International Electrotechnical Commission in standard IEC 60793-1-44. The IEC 60793-1-44 standard is hereby incorporated by reference in its entirety. The optical fiber typically has a 22-meter cable cutoff wavelength (22 m-$\lambda_{cc}$) that is less than about 1650 nanometers. More typically, the optical fiber has a 22-meter cable cutoff wavelength (22 m-$\lambda_{cc}$) that is less than 1530 nanometers (e.g., less than 1450 nm).

The following tables (below) illustrate aspects of the present invention by providing both comparative and inventive optical-fiber examples (e.g., prophetic examples). To facilitate the following discussion, for comparative and inventive optical-fiber examples having a refractive index profile similar to FIG. 1, the intermediate cladding is referred to as the first intermediate cladding.

Table 1 (below) characterizes the index profiles of 11 optical-fiber examples. Table 1's first column provides a reference for each profile. The following three columns provide the central core's outer radius $r_1$, the first intermediate cladding's outer radius $r_2$, and the ratio $r_1:r_2$ of the central core's outer radius to the intermediate cladding's outer radius. The next two columns provide the buried trench's outer radius $r_3$ and width $w_3$. The following column provides the second intermediate cladding's outer radius $r_4$ where applicable, and the next column provides the outer cladding's outer radius.

Thereafter, Table 1 provides, for a wavelength of 633 nanometers and with respect to the outer cladding, the refractive index differences for: the central core $Dn_1$; the first intermediate cladding $Dn_2$; the buried trench $Dn_3$; and the second intermediate cladding $Dn_4$ where applicable. For the sake of completeness and to further illustrate the meaning of a refractive index difference as used herein, the last column provides the outer cladding's refractive index difference $Dn_5$ with respect to itself is equal to zero.

The values in Table 1 correspond to the set profiles of the optical-fiber examples. As previously discussed, manufactured optical fibers typically possess refractive index profiles that deviate slightly from their set profiles (i.e., the theoretical refractive-index profiles).

includes a first intermediate cladding, a buried trench, and a second intermediate cladding (e.g., similar to FIG. 2). In this example, the second intermediate cladding's outer radius $r_4$ is less than 41 microns and the second intermediate cladding's refractive index difference $Dn_4$ is between about $-10.5 \times 10^{-3}$ and $-6.5 \times 10^{-3}$.

Optical-fiber examples 1b-std, 1c-std, 1d-std, and 1e-std are comparative optical fibers that are presented for comparison with exemplary optical fiber 1-std.

Table 2 provides the optical properties of the exemplary and comparative optical fibers of Table 1.

In Table 2, the first column repeats the references of Table 1. The following three columns provide, for each fiber profile

TABLE 1

| Examples | $r_1$ (μm) | $r_2$ (μm) | $r_2/r_1$ (μm) | $r_3$ (μm) | $w_3$ (μm) | $r_4$ (μm) | $r_5$ (μm) | $Dn_1$ @633 nm ($\times 10^{-3}$) | $Dn_2$ @633 nm ($\times 10^{-3}$) | $Dn_3$ @633 nm ($\times 10^{-3}$) | $Dn_4$ @633 nm ($\times 10^{-3}$) | $Dn_5$ @633 nm ($\times 10^{-3}$) |
|---|---|---|---|---|---|---|---|---|---|---|---|---|
| 1-std | 1.81 | 12.65 | 7.00 | 18.00 | 5.35 | | 62.5 | 8.70 | 1.50 | −8.0 | | 0.0 |
| 1b-std | 1.81 | 6.35 | 3.50 | 11.70 | 5.35 | | 62.5 | 8.70 | 1.50 | −8.0 | | 0.0 |
| 1c-std | 1.81 | 12.65 | 7.00 | 18.00 | 5.35 | | 62.5 | 8.70 | 0.50 | −8.0 | | 0.0 |
| 1d-std | 2.70 | 12.65 | 4.07 | 18.00 | 5.35 | | 62.5 | 5.50 | 0.00 | −8.0 | | 0.0 |
| 1e-std | 2.70 | 15.65 | 5.80 | 18.00 | 2.35 | | 62.5 | 8.70 | 0.00 | −8.0 | | 0.0 |
| 1-PSC | 1.81 | 12.65 | 7.00 | 18.00 | 5.35 | 40.0 | 62.5 | 0.00 | −7.20 | −16.7 | −8.7 | 0.0 |
| 2-std | 2.19 | 14.00 | 6.40 | 18.00 | 4.00 | | 62.5 | 7.40 | 1.50 | −6.5 | | 0.0 |
| 3-std | 1.56 | 11.82 | 7.60 | 17.47 | 5.65 | | 62.5 | 10.00 | 1.70 | −7.3 | | 0.0 |
| 4-std | 1.95 | 12.55 | 6.40 | 18.00 | 5.45 | | 62.5 | 7.90 | 1.50 | −8.0 | | 0.0 |
| 5-std | 2.14 | 12.72 | 5.90 | 18.00 | 5.28 | | 62.5 | 7.10 | 1.50 | −9.0 | | 0.0 |
| 6-std | 1.62 | 12.85 | 7.90 | 18.00 | 5.15 | | 62.5 | 10.00 | 1.50 | −9.0 | | 0.0 |

Optical-fiber examples 1-std, 2-std, 3-std, 4-std, 5-std, and 6-std are exemplary optical fibers according to the invention that have an inner cladding that includes a first intermediate cladding and the buried trench (e.g., similar to FIG. 1). In these examples, the second intermediate cladding's outer radius $r_4$ and the second intermediate cladding's refractive index difference $Dn_4$ are not provided because the optical fiber's inner cladding does not include a second intermediate cladding.

Optical-fiber example 1-PSC is an exemplary optical fiber according to the invention that has an inner cladding that at a wavelength of 1550 nanometers, the values of: chromatic dispersion (D); chromatic dispersion slope; effective area $A_{eff}$; and the fundamental mode leakage loss $P_{leak}$. The next two columns provide bending losses $P_{10mm}$ and $P_{30mm}$ for respective radii of curvature of 10 millimeters and 30 millimeters at a wavelength of 1550 nanometers. The next column provides bending losses $P_{30mm}$ as measured at a wavelength of 1625 nanometers for a radius of curvature of 30 millimeters. The last column provides the 22-meter cable cutoff wavelength (22 m-$\lambda_{cc}$).

TABLE 2

| Examples | D @1550 nm (ps/(nm · km)) | Slope @1550 nm (ps/(nm$^2$ · km)) | $A_{eff}$ @1550 nm (μm$^2$) | $P_{leak}$ @1550 nm (dB/km) | $P_{10\,mm}$ @1550 nm (dB/turn) | $P_{30\,mm}$ @1550 nm (dB/100 turns) | $P_{30\,mm}$ @1625 nm (dB/100 turns) | 22 m-$\lambda_{cc}$ (nm) |
|---|---|---|---|---|---|---|---|---|
| 1-std | 7.3 | 0.102 | 97 | | <1 | >0.005 | <0.05 | <1450 |
| 1b-std | 13.3 | 0.079 | 53 | | <1 | >0.01 | >1 | <1100 |
| 1c-std | 2.3 | 0.105 | 77 | | >1 | >1 | >10 | <1100 |
| 1d-std | 9.6 | 0.075 | 79 | | <1 | >0.5 | >1 | <1100 |
| 1e-std | 6.5 | 0.053 | 46 | | <1 | <0.005 | <0.05 | <1150 |
| 1-PSC | 6.3 | 0.102 | 98 | <0.005 | <1 | <0.01 | <0.1 | <1500 |
| 2-std | 8.0 | 0.091 | 100 | | <3 | <0.005 | <0.05 | <1650 |
| 3-std | 8.0 | 0.107 | 100 | | <1 | <0.005 | <0.05 | <1450 |
| 4-std | 9.0 | 0.096 | 99 | | <2 | <0.005 | <0.05 | <1450 |
| 5-std | 11.0 | 0.090 | 105 | | <1 | <0.005 | <0.05 | <1450 |
| 6-std | 5.0 | 0.110 | 95 | | <1 | <0.005 | <0.05 | <1450 |

For a radius of curvature of 30 millimeters at a wavelength of 1625 nanometers, the exemplary optical fibers exhibit bending losses $P_{30mm}$ that are less than 0.5 dB/100 turns, and even less than 0.1 dB/100 turns. Indeed, for a radius of curvature of 30 millimeters at a wavelength of 1625 nanometers, exemplary optical fibers 1-std, 2-std, 3-std, 4-std, 5-std, and 6-std exhibit bending losses $P_{30mm}$ that are less than 0.05 dB/100 turns.

For a radius of curvature of 30 millimeters at a wavelength of 1550 nanometers, the exemplary optical fibers exhibit bending losses $P_{30mm}$ that are less than 0.01 dB/100 turns. Indeed, for a radius of curvature of 30 millimeters at a wavelength of 1550 nanometers, exemplary optical fibers 1-std, 2-std, 3-std, 4-std, 5-std, and 6-std exhibit bending losses $P_{30mm}$ that are less than 0.005 dB/100 turns.

Additionally, at a wavelength of 1550 nanometers, the exemplary optical fibers have effective areas $A_{eff}$ that are greater than or equal to 95 $\mu m^2$. At a wavelength of 1550 nanometers, the exemplary optical fibers also exhibit (i) chromatic dispersion values D of between 3 ps/(nm·km) and 14 ps/(nm·km), and (ii) chromatic dispersion slope values of 0.110 ps/(nm$^2$·km) or less.

The exemplary optical fibers possess 22-meter cable cutoff wavelengths (22 m-$\lambda_{cc}$) that are less than 1650 nanometers. Indeed, exemplary optical fibers 1-std, 1-PSC, 3-std, 4-std, 5-std, and 6-std possess 22-meter cable cutoff wavelengths (22 m-$\lambda_{cc}$) that are less than 1530 nanometers. Exemplary optical fibers 1-std, 3-std, 4-std, 5-std, and 6-std possess 22-meter cable cutoff wavelengths (22 m-$\lambda_{cc}$) that are less than 1450 nanometers.

At a wavelength of 1550 nanometers, exemplary optical fiber 1-PSC exhibits a fundamental mode leakage loss $P_{leak}$ that is less than 0.005 dB/km, while utilizing a second intermediate cladding having an outer radius of only 40 microns (see Table 1).

The comparative optical fibers 1b-std, 1c-std, 1d-std, and 1e-std are similar to exemplary optical fiber 1-std but certain refractive index profile characteristics are modified. The comparative optical fiber examples are described in comparison with exemplary optical fiber 1-std to further illustrate the advantages of the exemplary optical fibers.

Comparative optical fiber 1b-std differs from the exemplary optical fiber 1-std in that the buried trench is closer to the central core. The comparative optical fiber 1b-std's ratio $r_2$:$r_1$ is 3.5, whereas exemplary optical fiber 1-std's ratio $r_2$:$r_1$ is 7. Consequently, comparative optical fiber 1b-std's effective area is reduced to less than 55 $\mu m^2$, and, for a radius of curvature of 30 millimeters at a wavelength of 1625 nanometers, bending losses are increased to more than 1 dB/100 turns. The comparative optical fiber 1b-std's chromatic dispersion D is also higher than exemplary optical fiber 1-std's chromatic dispersion D.

Comparative optical fiber 1c-std differs from the exemplary optical fiber 1-std in that the first intermediate cladding's refractive index difference $Dn_2$ is smaller. Indeed, in comparative optical fiber 1c-std, the first intermediate cladding's refractive index difference $Dn_2$ is $0.5 \times 10^{-3}$, whereas, in exemplary optical fiber 1-std the first intermediate cladding's refractive index difference $Dn_2$ is $1.5 \times 10^{-3}$. Consequently, comparative optical fiber 1c-std's effective area is reduced to less than 80 $\mu m^2$, and, for a radius of curvature of 30 millimeters at a wavelength of 1625 nanometers, bending losses are increased to more than 10 dB/100 turns.

Comparative optical fiber 1d-std differs from the exemplary optical fiber 1-std in that the characteristics of the central core are modified. In particular, comparative optical fiber 1d-std's maximum refractive index difference $Dn_1$ is $5.5 \times 10^{-3}$, as compared to exemplary optical fiber 1-std's maximum refractive index difference $Dn_1$ of $8.7 \times 10^{-3}$. In comparative optical fiber 1d-std, the central core's outer radius $r_1$ is increased to 2.7 microns. Additionally, in comparative optical fiber 1d-std, the first intermediate cladding's refractive index difference $Dn_2$ is zero, as compared to $1.5 \times 10^{-3}$ in example 1-std. Consequently, comparative optical fiber 1d-std's effective area is decreased to less than 80 $\mu m^2$, and, for a radius of curvature of 30 millimeters at a wavelength of 1625 nanometers, bending losses are increased to more than 1 dB/100 turns.

Comparative optical fiber 1e-std differs from the exemplary optical fiber 1-std in that: (i) the central core's outer radius $r_1$ is increased to more than 2.5 microns; (ii) the first intermediate cladding's refractive index difference $Dn_2$ is zero; and (iii) the buried trench's width $w_3$ is reduced to less than 3 microns. The chromatic dispersion slope and the 22-meter cable cutoff wavelength (22 m-$\lambda_{cc}$) are reduced. Bending losses are not significantly modified because the central core's maximum refractive index difference $Dn_1$ is unchanged, and the reduction of the first intermediate cladding's refractive index difference $Dn_2$ is compensated by the increased central core outer radius. Nevertheless, comparative optical fiber 1e-std's effective area is decreased to less than 50 $\mu m^2$.

The optical fiber according to the invention typically complies with the recommendations of ITU-T G.655 and G.656 standards for NZDSFs. In particular, the ITU-T G.655 and G.656 standards for NZDSFs recommend (i) an 22-meter cable cutoff wavelength (22 m-$\lambda_{cc}$) of less than 1450 nanometers, and (ii) at a wavelength of 1550 nanometers, a mode field diameter of between about 7 microns and 11 microns, or between about 8 microns and 11 microns. Accordingly, optical fibers according to the present invention may be installed in numerous transmission systems and present good compatibility with the other fibers of the system.

Exemplary optical fibers of the invention are well-suited for long-distance transmission systems operating in the C-band, and particularly in wavelength division multiplex applications. The optical fiber's increased effective area, without significant degradation of other optical parameters, make it possible to increase the transmission power of the optical signals without increasing non-linear effects. Thus, signal-to-noise ratio of the transmission line may be improved, which is particularly desirable for long-distance optical transmission systems on land and undersea. The decrease in bending losses, in particular for large radii of curvature, also contributes to a better signal quality.

The present optical fibers may facilitate the reduction in overall optical-fiber diameter. As will be appreciated by those having ordinary skill in the art, a reduced-diameter optical fiber is cost-effective, requiring less raw material. Moreover, a reduced-diameter optical fiber requires less deployment space (e.g., within a buffer tube and/or fiber optic cable), thereby facilitating increased fiber count and/or reduced cable size.

Those having ordinary skill in the art will recognize that an optical fiber with a primary coating (and an optional secondary coating and/or ink layer) typically has an outer diameter of between about 235 microns and about 265 microns ($\mu m$). The component glass fiber itself (i.e., the glass core and surrounding cladding layers) typically has a diameter of about 125 microns, such that the total coating thickness is typically between about 55 microns and 70 microns.

With respect to the present optical fiber, the component glass fiber typically has an outer diameter of about 125 microns. With respect to the optical fiber's surrounding coating layers, the primary coating typically has an outer diameter of between about 175 microns and about 195 microns (i.e., a primary coating thickness of between about 25 microns and 35 microns), and the secondary coating typically has an outer diameter of between about 235 microns and about 265 microns (i.e., a secondary coating thickness of between about 20 microns and 45 microns). Optionally, the present optical fiber may include an outermost ink layer, which is typically between two and ten microns in thickness.

In one alternative embodiment, an optical fiber may possess a reduced diameter (e.g., an outermost diameter between about 150 microns and 230 microns). In this alternative optical fiber configuration, the thickness of the primary coating and/or secondary coating is reduced, while the diameter of the component glass fiber is maintained at about 125 microns. (Those having ordinary skill in the art will appreciate that, unless otherwise specified, diameter measurements refer to outer diameters.)

By way of illustration, in such exemplary embodiments the primary coating layer may have an outer diameter of between about 135 microns and about 175 microns (e.g., about 160 microns), typically less than 165 microns (e.g., between about 135 microns and 150 microns), and usually more than 140 microns (e.g., between about 145 microns and 155 microns, such as about 150 microns).

Moreover, in such exemplary embodiments the secondary coating layer may have an outer diameter of between about 150 microns and about 230 microns (e.g., more than about 165 microns, such as 190-210 microns or so), typically between about 180 microns and 200 microns. In other words, the total diameter of the optical fiber is reduced to less than about 230 microns (e.g., between about 195 microns and 205 microns, and especially about 200 microns). By way of further illustration, an optical fiber may employ a secondary coating of about 197 microns at a tolerance of +/−5 microns (i.e., a secondary-coating outer diameter of between 192 microns to 202 microns). Typically, the secondary coating will retain a thickness of at least about 10 microns (e.g., an optical fiber having a reduced thickness secondary coating of between 15 microns and 25 microns).

In another alternative embodiment, the outer diameter of the component glass fiber may be reduced to less than 125 microns (e.g., between about 60 microns and 120 microns), perhaps between about 70 microns and 115 microns (e.g., about 80-110 microns). This may be achieved, for instance, by reducing the thickness of one or more cladding layers. As compared with the prior alternative embodiment, (i) the total diameter of the optical fiber may be reduced (i.e., the thickness of the primary and secondary coatings are maintained in accordance with the prior alternative embodiment) or (ii) the respective thicknesses of the primary and/or secondary coatings may be increased relative to the prior alternative embodiment (e.g., such that the total diameter of the optical fiber might be maintained).

By way of illustration, with respect to the former, a component glass fiber having a diameter of between about 90 and 100 microns might be combined with a primary coating layer having an outer diameter of between about 110 microns and 150 microns (e.g., about 125 microns) and a secondary coating layer having an outer diameter of between about 130 microns and 190 microns (e.g., about 155 microns). With respect to the latter, a component glass fiber having a diameter of between about 90 and 100 microns might be combined with a primary coating layer having an outer diameter of between about 120 microns and 140 microns (e.g., about 130 microns) and a secondary coating layer having an outer diameter of between about 160 microns and 230 microns (e.g., about 195-200 microns).

Reducing the diameter of the component glass fiber might make the resulting optical fiber more susceptible to microbending attenuation. That said, the advantages of further reducing optical-fiber diameter may be worthwhile for some optical-fiber applications.

As noted, the present optical fibers may include one or more coating layers (e.g., a primary coating and a secondary coating). At least one of the coating layers—typically the secondary coating—may be colored and/or possess other markings to help identify individual fibers. Alternatively, a tertiary ink layer may surround the primary and secondary coatings.

The present optical fibers may be manufactured by drawing from final preforms.

A final preform may be manufactured by providing a primary preform with an outer overcladding layer (i.e., an overcladding process). The outer overcladding layer typically consists of doped or undoped, natural or synthetic, silica glass. Several methods are available for providing the outer overcladding layer.

In a first exemplary method, the outer overcladding layer may be provided by depositing and vitrifying natural or synthetic silica particles on the outer periphery of the primary preform under the influence of heat. Such a process is known, for example, from U.S. Pat. Nos. 5,522,007, 5,194,714, 6,269,663, and 6,202,447, each of which is hereby incorporated by reference in its entirety.

In another exemplary method, a primary preform may be overcladded using a silica sleeve tube, which may or may not be doped. This sleeve tube may then be collapsed onto the primary preform.

In yet another exemplary method, an overcladding layer may be applied via an Outside Vapor Deposition (OVD) method. Here, a soot layer is first deposited on the outer periphery of a primary preform, and then the soot layer is vitrified to form glass.

The primary preforms may be manufactured via outside vapor deposition techniques, such as Outside Vapor Deposition (OVD) and Vapor Axial Deposition (VAD). Alternatively, the primary preforms may be manufactured via inside deposition techniques in which glass layers are deposited on the inner surface of a substrate tube of doped or undoped silica glass, such as Modified Chemical Vapor Deposition (MCVD), Furnace Chemical Vapor Deposition (FCVD), and Plasma Chemical Vapor Deposition (PCVD).

By way of example, the primary preforms may be manufactured using a PCVD process, which can precisely control the central core's gradient refractive index profile.

A depressed trench, for instance, may be deposited on the inner surface of a substrate tube as part of the chemical vapor deposition process. More typically, a depressed trench may be manufactured either (i) by using a fluorine-doped substrate tube as the starting point of the internal deposition process for deposition of the gradient refractive index central core or (ii) by sleeving a fluorine-doped silica tube over the gradient refractive index central core, which itself may be produced using an outside deposition process (e.g., OVD or VAD). Accordingly, a component glass fiber manufactured from the resulting preform may have a depressed trench located at the periphery of its central core.

As noted, a primary preform may be manufactured via an inside deposition process using a fluorine-doped substrate tube. The resulting tube containing the deposited layers may be sleeved by one or more additional fluorine-doped silica tubes so as to increase the thickness of a depressed trench, or to create a depressed trench having a varying refractive index over its width. Although not required, one or more additional sleeve tubes (e.g., fluorine-doped substrate tubes) may be collapsed onto the primary preform before an overcladding step is carried out. The process of sleeving and collapsing is sometimes referred to as jacketing and may be repeated to build several glass layers on the outside of the primary preform.

The present optical fibers may be deployed in various structures, such as those exemplary structures disclosed hereinafter.

For example, one or more of the present optical fibers may be enclosed within a buffer tube. For instance, optical fiber may be deployed in either a single-fiber loose buffer tube or a multi-fiber loose buffer tube. With respect to the latter, multiple optical fibers may be bundled or stranded within a buffer tube or other structure. In this regard, within a multi-fiber loose buffer tube, fiber sub-bundles may be separated with binders (e.g., each fiber sub-bundle is enveloped in a binder). Moreover, fan-out tubing may be installed at the termination of such loose buffer tubes to directly terminate loose buffered optical fibers with field-installed connectors.

In other embodiments, the buffer tube may tightly surround the outermost optical fiber coating (i.e., tight buffered fiber) or otherwise surround the outermost optical-fiber coating or ink layer to provide an exemplary radial clearance of between about 50 and 100 microns (i.e., a semi-tight buffered fiber).

With respect to the former tight buffered fiber, the buffering may be formed by coating the optical fiber with a curable composition (e.g., a UV-curable material) or a thermoplastic material. The outer diameter of tight buffer tubes, regardless of whether the buffer tube is formed from a curable or non-curable material, is typically less than about 1,000 microns (e.g., either about 500 microns or about 900 microns).

With respect to the latter semi-tight buffered fiber, a lubricant may be included between the optical fiber and the buffer tube (e.g., to provide a gliding layer).

As will be known by those having ordinary skill in the art, an exemplary buffer tube enclosing optical fibers as disclosed herein may be formed of polyolefins (e.g., polyethylene or polypropylene), including fluorinated polyolefins, polyesters (e.g., polybutylene terephthalate), polyamides (e.g., nylon), as well as other polymeric materials and blends. In general, a buffer tube may be formed of one or more layers. The layers may be homogeneous or include mixtures or blends of various materials within each layer.

In this context, the buffer tube may be extruded (e.g., an extruded polymeric material) or pultruded (e.g., a pultruded, fiber-reinforced plastic). By way of example, the buffer tube may include a material to provide high temperature and chemical resistance (e.g., an aromatic material or polysulfone material).

Although buffer tubes typically have a circular cross section, buffer tubes alternatively may have an irregular or non-circular shape (e.g., an oval or a trapezoidal cross-section).

Alternatively, one or more of the present optical fibers may simply be surrounded by an outer protective sheath or encapsulated within a sealed metal tube. In either structure, no intermediate buffer tube is necessarily required.

Multiple optical fibers as disclosed herein may be sandwiched, encapsulated, and/or edge bonded to form an optical fiber ribbon. Optical fiber ribbons can be divisible into subunits (e.g., a twelve-fiber ribbon that is splittable into six-fiber subunits). Moreover, a plurality of such optical fiber ribbons may be aggregated to form a ribbon stack, which can have various sizes and shapes.

For example, it is possible to form a rectangular ribbon stack or a ribbon stack in which the uppermost and lowermost optical fiber ribbons have fewer optical fibers than those toward the center of the stack. This construction may be useful to increase the density of optical elements (e.g., optical fibers) within the buffer tube and/or cable.

In general, it is desirable to increase the filling of transmission elements in buffer tubes or cables, subject to other constraints (e.g., cable or mid-span attenuation). The optical elements themselves may be designed for increased packing density. For example, the optical fiber may possess modified properties, such as improved refractive-index profile, core or cladding dimensions, or primary-coating thickness and/or modulus, to improve microbending and macrobending characteristics.

By way of example, a rectangular ribbon stack may be formed with or without a central twist (i.e., a "primary twist"). Those having ordinary skill in the art will appreciate that a ribbon stack is typically manufactured with rotational twist to allow the tube or cable to bend without placing excessive mechanical stress on the optical fibers during winding, installation, and use. In a structural variation, a twisted (or untwisted) rectangular ribbon stack may be further formed into a coil-like configuration (e.g., a helix) or a wave-like configuration (e.g., a sinusoid). In other words, the ribbon stack may possess regular "secondary" deformations.

As will be known to those having ordinary skill in the art, such optical fiber ribbons may be positioned within a buffer tube or other surrounding structure, such as a buffer-tube-free cable. Subject to certain restraints (e.g., attenuation), it is desirable to increase the density of elements such as optical fibers or optical fiber ribbons within buffer tubes and/or optical fiber cables.

A plurality of buffer tubes containing optical fibers (e.g., loose or ribbonized fibers) may be positioned externally adjacent to and stranded around a central strength member. This stranding can be accomplished in one direction, helically, known as "S" or "Z" stranding, or Reverse Oscillated Lay stranding, known as "S-Z" stranding. Stranding about the central strength member reduces optical fiber strain when cable strain occurs during installation and use.

Those having ordinary skill in the art will understand the benefit of minimizing fiber strain for both tensile cable strain and longitudinal compressive cable strain during installation or operating conditions.

With respect to tensile cable strain, which may occur during installation, the cable will become longer while the optical fibers can migrate closer to the cable's neutral axis to reduce, if not eliminate, the strain being translated to the optical fibers. With respect to longitudinal compressive strain, which may occur at low operating temperatures due to shrinkage of the cable components, the optical fibers will migrate farther away from the cable's neutral axis to reduce, if not eliminate, the compressive strain being translated to the optical fibers.

In a variation, two or more substantially concentric layers of buffer tubes may be positioned around a central strength member. In a further variation, multiple stranding elements (e.g., multiple buffer tubes stranded around a strength member) may themselves be stranded around each other or around a primary central strength member.

Alternatively, a plurality of buffer tubes containing optical fibers (e.g., loose or ribbonized fibers) may be simply placed externally adjacent to the central strength member (i.e., the buffer tubes are not intentionally stranded or arranged around the central strength member in a particular manner and run substantially parallel to the central strength member).

Alternatively still, the present optical fibers may be positioned within a central buffer tube (i.e., the central buffer tube cable has a central buffer tube rather than a central strength member). Such a central buffer tube cable may position strength members elsewhere. For instance, metallic or non-metallic (e.g., GRP) strength members may be positioned within the cable sheath itself, and/or one or more layers of high-strength yarns (e.g., aramid or non-aramid yarns) may be positioned parallel to or wrapped (e.g., contrahelically) around the central buffer tube (i.e., within the cable's interior space). As will be understood by those having ordinary skill in the art, such strength yarns provide tensile strength to fiber optic cables. Likewise, strength members can be included within the buffer tube's casing.

Strength yarns may be coated with a lubricant (e.g., fluoropolymers), which may reduce unwanted attenuation in fiber optic cables (e.g., rectangular, flat ribbon cables or round, loose tube cables) that are subjected to relatively tight bends (i.e., a low bend radius). Moreover, the presence of a lubricant on strength yarns (e.g., aramid strength yarns) may facilitate removal of the cable jacketing by reducing unwanted bonding between the strength yarns and the surrounding cable jacket.

In other embodiments, the optical fibers may be placed within a slotted core cable. In a slotted core cable, optical fibers, individually or as a fiber ribbon, may be placed within pre-shaped helical grooves (i.e., channels) on the surface of a central strength member, thereby forming a slotted core unit. The slotted core unit may be enclosed by a buffer tube. One or more of such slotted core units may be placed within a slotted core cable. For example, a plurality of slotted core units may be helically stranded around a central strength member.

Alternatively, the optical fibers may also be stranded in a maxitube cable design, whereby the optical fibers are stranded around themselves within a large multi-fiber loose buffer tube rather than around a central strength member. In other words, the large multi-fiber loose buffer tube is centrally positioned within the maxitube cable. For example, such maxitube cables may be deployed in optical ground wires (OPGW).

In another cabling embodiment, multiple buffer tubes may be stranded around themselves without the presence of a central member. These stranded buffer tubes may be surrounded by a protective tube. The protective tube may serve as the outer casing of the fiber optic cable or may be further surrounded by an outer sheath. The protective tube may tightly or loosely surround the stranded buffer tubes.

As will be known to those having ordinary skill in the art, additional elements may be included within a cable core. For example, copper cables or other active, transmission elements may be stranded or otherwise bundled within the cable sheath. Passive elements may also be placed within the cable core, such as between the interior walls of the buffer tubes and the enclosed optical fibers. Alternatively and by way of example, passive elements may be placed outside the buffer tubes between the respective exterior walls of the buffer tubes and the interior wall of the cable jacket, or within the interior space of a buffer-tube-free cable.

For example, yarns, nonwovens, fabrics (e.g., tapes), foams, or other materials containing water-swellable material and/or coated with water-swellable materials (e.g., including super absorbent polymers (SAPs), such as SAP powder) may be employed to provide water blocking and/or to couple the optical fibers to the surrounding buffer tube and/or cable jacketing (e.g., via adhesion, friction, and/or compression). Exemplary water-swellable elements are disclosed in commonly assigned U.S. Pat. No. 7,515,795 for a Water-Swellable Tape, Adhesive-Backed for Coupling When Used Inside a Buffer Tube, which is hereby incorporated by reference in its entirety.

Moreover, an adhesive (e.g., a hot-melt adhesive or curable adhesive, such as a silicone acrylate cross-linked by exposure to actinic radiation) may be provided on one or more passive elements (e.g., water-swellable material) to bond the elements to the buffer tube. An adhesive material may also be used to bond the water-swellable element to optical fibers within the buffer tube. Exemplary arrangements of such elements are disclosed in commonly assigned U.S. Pat. No. 7,599,589 for a Gel-Free Buffer Tube with Adhesively Coupled Optical Element, which is hereby incorporated by reference in its entirety.

The buffer tubes (or buffer-tube-free cables) may also contain a thixotropic composition (e.g., grease or grease-like gels) between the optical fibers and the interior walls of the buffer tubes. For example, filling the free space inside a buffer tube with water-blocking, petroleum-based filling grease helps to block the ingress of water. Further, the thixotropic filling grease mechanically (i.e., viscously) couples the optical fibers to the surrounding buffer tube.

Such thixotropic filling greases are relatively heavy and messy, thereby hindering connection and splicing operations. Thus, the present optical fibers may be deployed in dry cable structures (i.e., grease-free buffer tubes).

Exemplary buffer tube structures that are free from thixotropic filling greases are disclosed in commonly assigned U.S. Pat. No. 7,724,998 for a Coupling Composition for Optical Fiber Cables (Parris et al.), which is hereby incorporated by reference in its entirety. Such buffer tubes employ coupling compositions formed from a blend of high-molecular weight elastomeric polymers (e.g., about 35 weight percent or less) and oils (e.g., about 65 weight percent or more) that flow at low temperatures. Unlike thixotropic filling greases, the coupling composition (e.g., employed as a cohesive gel or foam) is typically dry and, therefore, less messy during splicing.

As will be understood by those having ordinary skill in the art, a cable enclosing optical fibers as disclosed herein may have a sheath formed from various materials in various designs. Cable sheathing may be formed from polymeric materials such as, for example, polyethylene, polypropylene, polyvinyl chloride (PVC), polyamides (e.g., nylon), polyester (e.g., PBT), fluorinated plastics (e.g., perfluorethylene propylene, polyvinyl fluoride, or polyvinylidene difluoride), and ethylene vinyl acetate. The sheath and/or buffer tube materials may also contain other additives, such as nucleating agents, flame-retardants, smoke-retardants, antioxidants, UV absorbers, and/or plasticizers.

The cable sheathing may be a single jacket formed from a dielectric material (e.g., non-conducting polymers), with or without supplemental structural components that may be used to improve the protection (e.g., from rodents) and strength provided by the cable sheath. For example, one or more layers of metallic (e.g., steel) tape, along with one or more dielectric jackets, may form the cable sheathing. Metallic or fiberglass reinforcing rods (e.g., GRP) may also be incorporated into the sheath. In addition, aramid, fiberglass, or polyester yarns may be employed under the various sheath materials (e.g., between the cable sheath and the cable core), and/or ripcords may be positioned, for example, within the cable sheath.

Similar to buffer tubes, optical fiber cable sheaths typically have a circular cross section, but cable sheaths alternatively may have an irregular or non-circular shape (e.g., an oval, trapezoidal, or flat cross-section).

By way of example, the present optical fiber may be incorporated into single-fiber drop cables, such as those employed for Multiple Dwelling Unit (MDU) applications. In such deployments, the cable jacketing must exhibit crush resistance, abrasion resistance, puncture resistance, thermal stability, and fire resistance as required by building codes. An exemplary material for such cable jackets is thermally stable, flame-retardant polyurethane (PUR), which mechanically protects the optical fibers yet is sufficiently flexible to facilitate easy MDU installations. Alternatively, a flame-retardant polyolefin or polyvinyl chloride sheath may be used.

In general, and as will be known to those having ordinary skill in the art, a strength member is typically in the form of a rod or braided/helically wound wires or fibers, though other configurations will be within the knowledge of those having ordinary skill in the art.

Optical fiber cables containing optical fibers as disclosed may be variously deployed, including as drop cables, distribution cables, feeder cables, trunk cables, and stub cables, each of which may have varying operational requirements (e.g., temperature range, crush resistance, UV resistance, and minimum bend radius).

Such optical fiber cables may be installed within ducts, microducts, plenums, or risers. By way of example, an optical fiber cable may be installed in an existing duct or microduct by pulling or blowing (e.g., using compressed air). An exemplary cable installation method is disclosed in commonly assigned U.S. Pat. No. 7,574,095 for a Communication Cable Assembly and Installation Method, (Lock et al.), and U.S. Pat. No. 7,665,902 for a Modified Pre-Ferrulized Communication Cable Assembly and Installation Method, (Griffioen et al.), each of which is incorporated by reference in its entirety.

As noted, buffer tubes containing optical fibers (e.g., loose or ribbonized fibers) may be stranded (e.g., around a central strength member). In such configurations, an optical fiber cable's protective outer sheath may have a textured outer surface that periodically varies lengthwise along the cable in a manner that replicates the stranded shape of the underlying buffer tubes. The textured profile of the protective outer sheath can improve the blowing performance of the optical fiber cable. The textured surface reduces the contact surface between the cable and the duct or microduct and increases the friction between the blowing medium (e.g., air) and the cable. The protective outer sheath may be made of a low coefficient-of-friction material, which can facilitate blown installation. Moreover, the protective outer sheath can be provided with a lubricant to further facilitate blown installation.

In general, to achieve satisfactory long-distance blowing performance (e.g., between about 3,000 to 5,000 feet or more), the outer cable diameter of an optical fiber cable should be no more than about 70 to 80 percent of the duct's or microduct's inner diameter.

Compressed air may also be used to install optical fibers in an air blown fiber system. In an air blown fiber system, a network of unfilled cables or microducts is installed prior to the installation of optical fibers. Optical fibers may subsequently be blown into the installed cables as necessary to support the network's varying requirements.

Moreover, the optical fiber cables may be directly buried in the ground or, as an aerial cable, suspended from a pole or pylon. An aerial cable may be self-supporting, or secured or lashed to a support (e.g., messenger wire or another cable). Exemplary aerial fiber optic cables include overhead ground wires (OPGW), all-dielectric self-supporting cables (ADSS), all dielectric lash cables (AD-Lash), and figure-eight cables, each of which is well understood by those having ordinary skill in the art. Figure-eight cables and other designs can be directly buried or installed into ducts, and may optionally include a toning element, such as a metallic wire, so that they can be found with a metal detector.

In addition, although the optical fibers may be further protected by an outer cable sheath, the optical fiber itself may be further reinforced so that the optical fiber may be included within a breakout cable, which allows for the individual routing of individual optical fibers.

To effectively employ the present optical fibers in a transmission system, connections are required at various points in the network. Optical fiber connections are typically made by fusion splicing, mechanical splicing, or mechanical connectors.

The mating ends of connectors can be installed to the optical fiber ends either in the field (e.g., at the network location) or in a factory prior to installation into the network. The ends of the connectors are mated in the field in order to connect the optical fibers together or connect the optical fibers to the passive or active components. For example, certain optical fiber cable assemblies (e.g., furcation assemblies) can separate and convey individual optical fibers from a multiple optical fiber cable to connectors in a protective manner.

The deployment of such optical fiber cables may include supplemental equipment, which itself may employ the present optical fiber as previously disclosed. For instance, an amplifier may be included to improve optical signals. Dispersion compensating modules may be installed to reduce the effects of chromatic dispersion and polarization mode dispersion. Splice boxes, pedestals, and distribution frames, which may be protected by an enclosure, may likewise be included. Additional elements include, for example, remote terminal switches, optical network units, optical splitters, and central office switches.

A cable containing the present optical fibers may be deployed for use in a communication system (e.g., networking or telecommunications). A communication system may include fiber optic cable architecture such as fiber-to-the-node (FTTN), fiber-to-the-telecommunications enclosure (FTTE), fiber-to-the-curb (FTTC), fiber-to-the-building (FTTB), and fiber-to-the-home (FTTH), as well as long-haul or metro architecture. Moreover, an optical module or a storage box that includes a housing may receive a wound portion of the optical fiber disclosed herein. By way of example, the optical fiber may be wound around a bending radius of less than about 15 millimeters (e.g., 10 millimeters or less, such as about 5 millimeters) in the optical module or the storage box.

Moreover, present optical fibers may be used in other applications, including, without limitation, fiber optic sensors or illumination applications (e.g., lighting).

The present optical fibers may include Fiber Bragg Grating (FBG). As will be known by those having ordinary skill in the art, FBG is a periodic or aperiodic variation in the refractive index of an optical fiber core and/or cladding. This variation in the refractive index results in a range of wavelengths (e.g., a narrow range) being reflected rather than transmitted, with maximum reflectivity occurring at the Bragg wavelength.

Fiber Bragg Grating is commonly written into an optical fiber by exposing the optical fiber to an intense source of ultraviolet light (e.g., a UV laser). In this respect, UV photons may have enough energy to break molecular bonds within an optical fiber, which alters the structure of the optical fiber, thereby increasing the optical fiber's refractive index. Moreover, dopants (e.g., boron or germanium) and/or hydrogen loading can be employed to increase photosensitivity.

In order to expose a coated glass fiber to UV light for the creation of FBG, the coating may be removed. Alternatively, coatings that are transparent at the particular UV wavelengths (e.g., the UV wavelengths emitted by a UV laser to write FBG) may be employed to render coating removal unnecessary. In addition, silicone, polyimide, acrylate, or PFCB coatings, for instance, may be employed for high-temperature applications.

A particular FBG pattern may be created by employing (i) a photomask placed between the UV light source and the optical fiber, (ii) interference between multiple UV light beams, which interfere with each other in accordance with the desired FBG pattern (e.g., a uniform, chirped, or titled pattern), or (iii) a narrow UV light beam for creating individual variations. The FBG structure may have, for example, a uniform positive-only index change, a Gaussian-apodized index change, a raised-cosine-apodized index change, or a discrete phase shift index change. Multiple FBG patterns may be combined on a single optical fiber.

Optical fibers having FBG may be employed in various sensing applications (e.g., for detecting vibration, temperature, pressure, moisture, or movement). In this respect, changes in the optical fiber (e.g., a change in temperature) result in a shift in the Bragg wavelength, which is measured by a sensor. FBG may be used to identify a particular optical fiber (e.g., if the optical fiber is broken into pieces).

Fiber Bragg Grating may also be used in various active or passive communication components (e.g., wavelength-selective filters, multiplexers, demultiplexers, Mach-Zehnder interferometers, distributed Bragg reflector lasers, pump/laser stabilizers, and supervisory channels).

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (Bigot-Astruc et al.); U.S. Pat. No. 7,555,186 for an Optical Fiber (Flammer et al.); U.S. Patent Application Publication No. US2009/0252469 A1 for a Dispersion-Shifted Optical Fiber (Sillard et al.); U.S. patent application Ser. No. 12/098,804 for a Transmission Optical Fiber Having Large Effective Area (Sillard et al.), filed Apr. 7, 2008; International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Patent Application Publication No. US2009/0279835 A1 for a Single-Mode Optical Fiber Having Reduced Bending Losses, filed May 6, 2009, (de Montmorillon et al.); U.S. Patent Application Publication No. US2009/0279836 A1 for a Bend-Insensitive Single-Mode Optical Fiber, filed May 6, 2009, (de Montmorillon et al.); U.S. Patent Application Publication No. US2010/0021170 A1 for a Wavelength Multiplexed Optical System with Multimode Optical Fibers, filed Jun. 23, 2009, (Lumineau et al.); U.S. Patent Application Publication No. US2010/0028020 A1 for a Multimode Optical Fibers, filed Jul. 7, 2009, (Gholami et al.); U.S. Patent Application Publication No. US2010/0119202 A1 for a Reduced-Diameter Optical Fiber, filed Nov. 6, 2009, (Overton); U.S. Patent Application Publication No. US2010/0142969 A1 for a Multimode Optical System, filed Nov. 6, 2009, (Gholami et al.); U.S. Patent Application Publication No. US2010/0118388 A1 for an Amplifying Optical Fiber and Method of Manufacturing, filed Nov. 12, 2009, (Pastouret et al.); U.S. Patent Application Publication No. US2010/0135627 A1 for an Amplifying Optical Fiber and Production Method, filed Dec. 2, 2009, (Pastouret et al.); U.S. Patent Application Publication No. US2010/0142033 for an Ionizing Radiation-Resistant Optical Fiber Amplifier, filed Dec. 8, 2009, (Regnier et al.); U.S. Patent Application Publication No. US2010/0150505 A1 for a Buffered Optical Fiber, filed Dec. 11, 2009, (Testu et al.); U.S. Patent Application Publication No. US2010/0171945 for a Method of Classifying a Graded-Index Multimode Optical Fiber, filed Jan. 7, 2010, (Gholami et al.); U.S. Patent Application Publication No. US2010/0189397 A1 for a Single-Mode Optical Fiber, filed Jan. 22, 2010, (Richard et al.); U.S. Patent Application Publication No. US2010/0189399 A1 for a Single-Mode Optical Fiber Having an Enlarged Effective Area, filed Jan. 27, 2010, (Sillard et al.); U.S. Patent Application Publication No. US2010/0189400 A1 for a Single-Mode Optical Fiber, filed Jan. 27, 2010, (Sillard et al.); U.S. Patent Application Publication No. US2010/0214649 A1 for an Optical Fiber Amplifier Having Nanostructures, filed Feb. 19, 2010, (Burow et al.); U.S. Patent Application Publication No. US2010/0254653 A1 for a Multimode Fiber, filed Apr. 22, 2010, (Molin et al.); U.S. patent application Ser. No. 12/794,229 for a Large Bandwidth Multimode Optical Fiber Having a Reduced Cladding Effect, filed Jun. 4, 2010, (Molin et al.); U.S. patent application Ser. No. 12/878,449 for a Multimode Optical Fiber Having Improved Bending Losses, filed Sep. 9, 2010, (Molin et al.); U.S. patent application Ser. No. 12/884,834 for a Multimode Optical Fiber, filed Sep. 17, 2010, (Molin et al.); U.S. patent application Ser. No. 12/887,813 for an Optical Fiber for Sum-Frequency Generation, filed Sep. 22, 2010, (Richard et al.); U.S. patent application Ser. No. 12/953,948 for a High-Bandwidth, Multimode Optical Fiber with Reduced Cladding Effect, filed Nov. 24, 2010, (Molin et al.); U.S. patent application Ser. No. 12/954,036 for a High-Bandwidth, Dual-Trench-Assisted Multimode Optical Fiber, filed Nov. 24, 2010, (Molin et al.); U.S. patent application Ser. No. 12/959,688 for a Multimode Optical Fiber with Low Bending Losses and Reduced Cladding Effect, filed Dec. 3, 2010, (Molin et al.); and U.S. patent application Ser. No. 12/959,866 for a High-Bandwidth Multimode Optical Fiber Having Reduced Bending Losses, filed Dec. 3, 2010, (Molin et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,702,204 for a Method for Manufacturing an Optical Fiber Preform (Gonnet et al.); U.S. Pat. No. 7,570,852 for an Optical Fiber Cable Suited for Blown Installation or Pushing Installation in Microducts of Small Diameter (Nothofer et al.); U.S. Pat. No. 7,526,177 for a Fluorine-Doped Optical Fiber (Matthijsse et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Pat. No. 7,817,891 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Pat. No. 7,724,998 for a Coupling Composition for Optical Fiber Cables (Parris et al.); U.S. Patent Application Publication No. US2009/0214167 A1 for a Buffer Tube with Hollow Channels, (Lookadoo et al.); U.S. Patent Application Publication No. US2009/0297107 A1 for an Optical Fiber Telecommunication Cable, filed May 15, 2009, (Tatat); U.S. Patent Application Publication No. US2009/0279833 A1 for a Buffer Tube with Adhesively Coupled Optical Fibers and/or Water-Swellable Element, filed Jul. 21, 2009, (Overton et al.); U.S. Patent Application Publication No. US2010/0092135 A1 for an Optical Fiber Cable Assembly, filed Sep. 10, 2009, (Barker et al.); U.S. Patent Application Publication No. US2010/0067857 A1 for a High-Fiber-Density Optical Fiber Cable, filed Sep. 10, 2009, (Louie et al.); U.S. Patent Application Publication No. US2010/0067855 A1 for a Buffer Tubes for Mid-Span Storage, filed Sep. 11, 2009, (Barker); U.S. Patent Application Publication No. US2010/0135623 A1 for Single-Fiber Drop Cables for MDU Deployments, filed Nov. 9, 2009, (Overton); U.S. Patent Application Publication No. US2010/0092140 A1 for an Optical-Fiber Loose Tube Cables, filed Nov. 9, 2009, (Overton); U.S. Patent Application Publication No. US2010/0135624 A1 for a Reduced-Size Flat Drop Cable, filed Nov. 9, 2009, (Overton et al.); U.S. Patent Application Publication No. US2010/0092138 A1 for ADSS Cables with High-Performance Optical Fiber, filed Nov. 9, 2009, (Overton); U.S. Patent Application Publication No. US2010/0135625 A1 for Reduced-Diameter Ribbon Cables with High-Performance Optical Fiber, filed Nov. 10, 2009, (Overton); U.S. Patent Application Publication No. US2010/0092139 A1 for a Reduced-Diameter, Easy-Access Loose Tube Cable, filed Nov. 10, 2009, (Overton); U.S. Patent Application Publication No. US2010/0154479 A1 for a Method and Device for Manufacturing an Optical Preform, filed Dec. 19, 2009, (Milicevic et al.); U.S. Patent Application Publication No. US 2010/0166375 for a Perforated Water-Blocking Element, filed Dec. 29, 2009, (Parris); U.S. Patent Application Publication No. US2010/0183821 A1 for a UVLED Apparatus for Curing Glass-Fiber Coatings, filed Dec. 30, 2009, (Hartsuiker et al.); U.S. Patent Application Publication No. US2010/0202741 A1 for a Central-Tube Cable with High-Conductivity Conductors Encapsulated with High-Dielectric-Strength Insulation, filed Feb. 4, 2010, (Ryan et al.); U.S. Patent Application Publication No. US2010/0215328 A1 for a Cable Having Lubricated, Extractable Elements, filed Feb. 23, 2010, (Tatat et al.); U.S. patent application Ser. No. 12/843,116 for a Tight-Buffered Optical Fiber Unit Having Improved Accessibility, filed Jul. 26, 2010, (Risch et al.); U.S. patent application Ser. No. 12/881,598 for Methods and Devices for Cable Insertion into Latched Conduit, filed Sep. 14, 2010, (Leatherman et al.); U.S. patent application Ser. No. 12/907,241 for a High-Fiber-Density Optical-Fiber Cable, filed Oct. 19, 2010, (Overton et al.); U.S. patent application Ser. No. 12/907,265 for an Optical-Fiber Cable Having High Fiber Count and High Fiber Density, filed Oct. 19, 2010, (Tatat et al.); and U.S. patent application Ser. No. 13/009,118 for a Water-Soluble Water-Blocking Element, filed Jan. 19, 2011, (Parris).

In the specification and/or figures, typical embodiments of the invention have been disclosed. The present invention is not limited to such exemplary embodiments. The figures are schematic representations and so are not necessarily drawn to scale. Unless otherwise noted, specific terms have been used in a generic and descriptive sense and not for purposes of limitation.

The invention claimed is:

1. A non-zero dispersion shifted optical fiber, comprising:
   a central core having an outer radius $r_1$ and a maximum refractive index difference $Dn_1$ with respect to an outer cladding;
   a first intermediate cladding positioned between said central core and said outer cladding, said first intermediate cladding having an outer radius $r_2$ and a refractive index difference $Dn_2$ with respect to said outer cladding; and
   a buried trench positioned between said first intermediate cladding and said outer cladding, said buried trench having an outer radius $r_3$, a width $w_3$, and a negative refractive index difference $Dn_3$ with respect to said outer cladding;

wherein said central core's outer radius $r_1$ is between 1.0 micron and 2.5 microns;

wherein said central core's maximum refractive index difference $Dn_1$ is between $6.5 \times 10^{-3}$ and $10.5 \times 10^{-3}$;

wherein, for a radius of curvature of 30 millimeters at a wavelength of 1625 nanometers, the optical fiber exhibits bending losses of less than 0.5 dB/100 turns; and wherein, at a wavelength of 1550 nanometers, the optical fiber's effective area is 95 µm² or greater.

2. The optical fiber according to claim 1, wherein, for a radius of curvature of 30 millimeters at a wavelength of 1625 nanometers, the optical fiber exhibits bending losses of less than 0.05 dB/100 turns.

3. The optical fiber according to claim 1, wherein, for a radius of curvature of 30 millimeters at a wavelength of 1550 nanometers, the optical fiber exhibits bending losses of less than 0.005 dB/100 turns.

4. The optical fiber according to claim 1, wherein the optical fiber possesses a 22-meter cable cutoff wavelength (22 m-$\lambda_{cc}$) of less than 1650 nanometers.

5. The optical fiber according to claim 1, wherein the optical fiber possesses a 22-meter cable cutoff wavelength (22 m-$\lambda_{cc}$) of less than 1450 nanometers.

6. The optical fiber according to claim 1, wherein, at a wavelength of 1550 nanometers, the optical fiber exhibits chromatic dispersion of between about 4 ps/(nm·km) and 12 ps/(nm·km).

7. The optical fiber according to claim 1, wherein, at a wavelength of 1550 nanometers, the optical fiber exhibits a chromatic dispersion slope of about 0.110 ps/(nm²·km) or less.

8. The optical fiber according to claim 1, wherein said central core has a step refractive-index profile.

9. The optical fiber according to claim 1, wherein the ratio $r_2:r_1$ of said first intermediate cladding's outer radius $r_2$ to said central core's outer radius $r_1$ is between about 5 and 9.

10. The optical fiber according to claim 1, wherein said buried trench's width $w_3$ is between about 3 microns and 6 microns.

11. The optical fiber according to claim 1, wherein said buried trench's outer radius $r_3$ is less than 19 microns.

12. The optical fiber according to claim 1, wherein said first intermediate cladding's refractive index difference $Dn_2$ is between about $1 \times 10^{-3}$ and $2.5 \times 10^{-3}$.

13. The optical fiber according to claim 1, wherein said buried trench's refractive index difference $Dn_3$ is between about $-15 \times 10^{-3}$ and $-4 \times 10^{-3}$.

14. The optical fiber according to claim 1, wherein, at a wavelength of 1550 nanometers, the optical fiber exhibits attenuation of about 0.190 dB/km or less.

15. A non-zero dispersion shifted optical fiber, comprising:
a central core having an outer radius $r_1$ and a maximum refractive index difference $Dn_1$ with respect to an outer cladding;
a first intermediate cladding positioned between said central core and said outer cladding, said first intermediate cladding having an outer radius $r_2$ and a refractive index difference $Dn_2$ with respect to said outer cladding;
a buried trench positioned between said first intermediate cladding and said outer cladding, said buried trench having an outer radius $r_3$, a width $w_3$, and a negative refractive index difference $Dn_3$ with respect to said outer cladding; and
a second intermediate cladding positioned between said buried trench and said outer cladding, said second intermediate cladding having an outer radius $r_4$ and a refractive index difference $Dn_4$ with respect to said outer cladding;
wherein said central core's outer radius $r_1$ is between 1.0 micron and 2.5 microns;
wherein the difference $Dn_1-Dn_4$ between said central core's maximum refractive index difference $Dn_1$ and said second intermediate cladding's refractive index difference $Dn_4$ is between $6.5 \times 10^{-3}$ and $10.5 \times 10^{-3}$;
wherein, for a radius of curvature of 30 millimeters at a wavelength of 1625 nanometers, the optical fiber exhibits bending losses of less than 0.5 dB/100 turns; and
wherein, at a wavelength of 1550 nanometers, the optical fiber's effective area is 95 µm² or greater.

16. The optical fiber according to claim 15, wherein said central core consists essentially of pure silica.

17. The optical fiber according to claim 15, wherein, for a radius of curvature of 30 millimeters at a wavelength of 1625 nanometers, the optical fiber exhibits bending losses of less than 0.1 dB/100 turns.

18. The optical fiber according to claim 15, wherein, for a radius of curvature of 30 millimeters at a wavelength of 1550 nanometers, the optical fiber exhibits bending losses of less than 0.01 dB/100 turns.

19. The optical fiber according to claim 15, wherein the optical fiber possesses a 22-meter cable cutoff wavelength (22 m-$\lambda_{cc}$) of less than 1530 nanometers.

20. The optical fiber according to claim 15, wherein, at a wavelength of 1550 nanometers, the optical fiber exhibits chromatic dispersion of between about 3 ps/(nm·km) and 14 ps/(nm·km).

21. The optical fiber according to claim 15, wherein said second intermediate cladding's refractive index difference $Dn_4$ is between about $-10.5 \times 10^{-3}$ and $-6.5 \times 10^{-3}$.

22. The optical fiber according to claim 15, wherein said second intermediate cladding's outer radius $r_4$ is about 41 microns or less.

23. The optical fiber according to claim 15, wherein the difference $Dn_2-Dn_4$ between said first intermediate cladding's refractive index difference $Dn_2$ and said second intermediate cladding's refractive index difference $Dn_4$ is between about $1 \times 10^{-3}$ and $2.5 \times 10^{-3}$.

24. The optical fiber according to claim 15, wherein the difference $Dn_3-Dn_4$ between said buried trench's refractive index difference $Dn_3$ and said second intermediate cladding's refractive index difference $Dn_4$ is between about $-15 \times 10^{-3}$ and $-4 \times 10^{-3}$.

25. The optical fiber according to claim 15, wherein, at a wavelength of 1550 nanometers, the optical fiber exhibits attenuation of about 0.190 dB/km or less.

26. The optical fiber according to claim 15, wherein, at a wavelength of 1550 nanometers, the optical fiber exhibits attenuation of about 0.180 dB/km or less.

27. A non-zero dispersion shifted, single-mode optical fiber, comprising:
a central core having an outer radius $r_1$ and a maximum refractive index difference $Dn_1$ with respect to an outer cladding;
a first intermediate cladding positioned between said central core and said outer cladding, said first intermediate cladding having an outer radius $r_2$ and a refractive index difference $Dn_2$ with respect to said outer cladding; and
a buried trench positioned between said first intermediate cladding and said outer cladding, said buried trench having an outer radius $r_3$, a width $w_3$, and a negative refractive index difference $Dn_3$ with respect to said outer cladding;

wherein said central core's outer radius $r_1$ is between 1.0 micron and 2.5 microns;

wherein said central core's maximum refractive index difference $Dn_1$ is between $6.5 \times 10^{-3}$ and $10.5 \times 10^{-3}$;

wherein, for a radius of curvature of 30 millimeters at a wavelength of 1625 nanometers, the optical fiber exhibits bending losses of less than 0.5 dB/100 turns;

wherein, at a wavelength of 1550 nanometers, the optical fiber exhibits positive chromatic dispersion of 14 ps/(nm·km) or less; and wherein, at a wavelength of 1550 nanometers, the optical fiber's effective area is 95 $\mu m^2$ or greater.

* * * * *